US012717786B2

(12) United States Patent
He et al.

(10) Patent No.: US 12,717,786 B2
(45) Date of Patent: Aug. 25, 2026

(54) OPTIMIZING DATA TABLE TRANSFORMATIONS AND JOINS FOR PROCESSING TOOLS

(71) Applicant: Microsoft Technology Licensing, LLC, Redmond, WA (US)

(72) Inventors: Yeye He, Bellevue, WA (US); Surajit Chaudhuri, Kirkland, WA (US); Yujing Lai, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/003,975

(22) Filed: Dec. 27, 2024

(65) Prior Publication Data

US 2026/0187071 A1 Jul. 2, 2026

(51) Int. Cl.
*G06F 16/2453* (2019.01)

(52) U.S. Cl.
CPC .............................. *G06F 16/24544* (2019.01)

(58) Field of Classification Search
CPC ................................................. G06F 16/24544
See application file for complete search history.

(56) References Cited

U.S. PATENT DOCUMENTS 9,576,015 B1 * 2/2017 Tolnay .................. G06F 16/258
11,416,469 B2 * 8/2022 Hoang ................... G06N 3/088
2018/0173763 A1 * 6/2018 Xia ..................... G06F 16/9038
2019/0188308 A1 * 6/2019 Simon ................... G06F 16/219

OTHER PUBLICATIONS

Li, et al., "Table-GPT: Table-tuned GPT for Diverse Table Tasks", In Repository of arXiv preprint arXiv:2310.09263v1, Oct. 13, 2023, 47 Pages.
Lin, et al., "Auto-BI: Automatically Build BI-Models Leveraging Local Join Prediction and Global Schema Graph", arXiv preprint arXiv:2306.12515v1, Jun. 21, 2023, 18 pages.
Lyons, Bethany., "Relationships: Asking Questions Across Multiple Related Tables", Retrieved From: https://www.tableau.com/blog/relationships-asking-questions-across-multiple-related-tables, Jun. 12, 2020, 15 Pages.

(Continued)

*Primary Examiner* — Hares Jami
(74) *Attorney, Agent, or Firm* — Ray Quinney & Nebeker P.C.; James Bullough

(57) ABSTRACT

The present disclosure generally relates to systems and methods for jointly predicting data table transformations and joins to prepare input data tables for various intelligence tools and applications. For example, the systems and methods discussed herein reason across transformations and joins within a set of data tables to increase the accuracy of both transformation and join predictions. The systems and methods discussed herein can jointly predict transformations and joins for a set of data tables by generating a graph representation that accounts for possible transformations of each data table in the set as well as join possibilities between the possible transformations. By solving this graph, the systems and methods discussed herein generate a sequence of transformations and joins for the set of data tables that jointly maximizes both the transformation probabilities and the join probabilities for the data tables in the input set of data tables.

20 Claims, 12 Drawing Sheets

(56) References Cited

OTHER PUBLICATIONS

Mackinlay, et al., "Show Me: Automatic Presentation for Visual Analysis", In Journal of IEEE transactions on visualization and computer graphics, vol. 13, No. 6, Nov. 5, 2007, pp. 1137-1144.
Martino, Alex., "How to transform data", Tableau forum, Retrieved From: https://community.tableau.com/s/question/0D54T00000C6BsmSAF/how-to-transform-data, Jan. 9, 2018, 3 Pages.
Mohammed, Afzal., "How To Pivot or Transform in Tableau", Tableau forum, Retrieved From: https://community.tableau.com/s/question/0D58b0000CFihDyCQJ/how-to-pivot-or-transform-in-tableau, Apr. 23, 2024, 2 Pages.
Narayan, et al., "Can Foundation Models Wrangle Your Data?", In Repository of arXiv preprint arXiv:2205.09911v2, Dec. 24, 2022, 12 Pages.
Negash, et al., "Business Intelligence", Communications of the Association for Information Systems, vol. 13, No. Article 15, Feb. 2004, pp. 175-193.
Nobari, et al., "DTT: An Example-Driven Tabular Transformer for Joinability by Leveraging Large Language Models", Proceedings of the ACM on Management of Data, vol. 2, No. 1, Dec. 25, 2023, 24 Pages.
OpenAI "GPT-4 Technical Report", In Repository of arXiv:2303.08774v6 [cs.CL], Mar. 4, 2024, 100 Pages.
Platt, John C, "Probabilistic Outputs for Support Vector Machines and Comparisons to Regularized Likelihood Methods.", Advances in large margin classifiers, vol. 10, No. 3, Mar. 26, 1999, 11 Pages.
Rosslyn-Smith, Wesley., "I'm trying to find a way to define a relationship between two excel sheets where the common field may extend across multiple fields.", Retrieved From: https://community.tableau.com/s/question/0D58b0000ADNKzZCQX/im-trying-to-find-a-way-to-define-a-relationship-between-two-excel-sheets-where-the-common-field-may-extend-across-multiple-fields, Oct. 16, 2022, 3 Pages.
Rostin, et al., "A Machine Learning Approach to Foreign Key Discovery", In Proceedings of WebDB, Jun. 28, 2009, 6 Pages.
Shoshani, Arie., "OLAP and Statistical Databases: Similarities and Differences.", Proceedings of the sixteenth ACM SIGACT-SIGMOD-SIGART symposium on Principles of database systems. 1997, pp. 185-196.
Souibgui, et al., "Data quality in ETL process: A preliminary study", Procedia Computer Science vol. 159, 2019, pp. 676-687.
Vassiliadis, et al., "A Survey of Extract-Transform-Load Technology", International Journal of Data Warehousing and Mining (IJDWM), vol. 5, No. 3, Jul.-Sep. 2009, 27 Pages.
Vassiliadis, et al., "A Survey of Logical Models for OLAP Databases", ACM Sigmod Record, vol. 28, No. 4, Dec. 1999, pp. 64-69.
Vesset, et al., "IDC MarketScape: U.S. Business Intelligence and Analytics Platforms 2022 Vendor Assessment", Retrieved From: https://my.idc.com/getdoc.jsp?containerId=US48061021, Jul. 2022, 3 Pages.
Wang., "Synthesizing Highly Expressive SQL Queries from Input-Output Examples", Proceedings of the 38th ACM SIGPLAN Conference on Programming Language Design and Implementation, Jun. 14, 2017, pp. 452-466.
Warren, et al., "Multi-column Substring Matching for Database Schema Translation", Proceedings of the 32nd international conference on Very large data bases, Sep. 2006, pp. 331-342.
Wei, et al., "Chain-of-thought Prompting Elicits Reasoning in Large Language Models", In 36th Conference on Neural Information Processing System, 2022, 14 Pages.
Yan, et al., "Auto-Suggest: Learning-to-Recommend Data Preparation Steps using Data Science Notebooks", In Proceedings of the ACM SIGMOD International Conference on Management of Data, Jun. 11, 2020, pp. 1539-1554.
Yang, et al., "Auto-Pipeline: Synthesizing Complex Data Pipelines By-Target Using Reinforcement Learning and Search", In Repository of arXiv preprint arXiv:2106.13861, Aug. 3, 2021, 16 pages.
Zhang, "Automatically Synthesizing SQL Queries from Input-Output Examples", In Proceedings of 28th IEEE/ACM International Conference on Automated Software Engineering (ASE), Nov. 11, 2013, pp. 224-234.
Zhang, et al., "On Multi-Column Foreign Key Discovery", In Journal of Proceedings of the VLDB Endowment, vol. 3, No. 1, Sep. 1, 2010, pp. 805-814.
Zhu, et al., "Auto-Join: Joining Tables by Leveraging Transformations", Proceedings of the VLDB Endowment, vol. 10, No. 10, Jun. 1, 2017, pp. 1034-1045.
"Calibration Of Probabilities in Sklearn", Retrieved From: https://scikit-learn.org/stable/modules/calibration.html, Retrieved on: Jul. 10, 2025, 8 Pages.
"Create and manage relationships in Power BI Desktop", Retrieved From: https://learn.microsoft.com/en-us/power-bi/transform-model/desktop-create-and-manage-relationships, Sep. 4, 2024, 30 Pages.
"Fast melt for data.table", Unpivot in R (melt), Retrieved From: https://rdatatable.gitlab.io/data.table/reference/melt.data.table.html, Retrieved on: Jul. 11, 2025, 13 Pages.
"Fine-tuning", OpenAI, Retrieved From: https://platform.openai.com/docs/guides/fine-tuning, Retrieved on: Jul. 11, 2025, 7 Pages.
"Fuel faster data, insights, and action with Tableau Next.", Retrieved From: https://www.tableau.com/, Retrieved Jul. 11, 2025, 24 Pages.
"Help with transforming data.", Power BI forum, Retrieved From: https://community.fabric.microsoft.com/t5/Power-Query/Help-with-transforming-data/m-p/3699752, Feb. 14, 2024, 6 Pages.
"Join All Sheets in One Excel After Transforming Them Individually", Power BI forums, Retrieved From: https://community.fabric.microsoft.com/t5/Power-Query/Join-all-sheets-in-one-excel-after-transforming-them/m-p/3155786, Mar. 27, 2023, 9 Pages.
"Model relationships in Power BI Desktop", Retrieved From: https://learn.microsoft.com/en-us/power-bi/transform-model/desktop-relationships-understand, Mar. 7, 2024, 18 Pages.
"pandas.concat", Python concatenate, Retrieved From: https://pandas.pydata.org/docs/reference/api/pandas.concat.html, Retrieved on: Jul. 11, 2025, 6 Pages.
"pandas.DataFrame.pivot", Retrieved From: https://pandas.pydata.org/pandas-docs/stable/reference/api/pandas. DataFrame.pivot.html, Retrieved on: Jul. 11, 2025, 4 Pages.
"pandas.DataFrame.transpose", Transpose in Python Pandas, Retrieved From: https://pandas.pydata.org/pandas-docs/stable/reference/api/pandas.DataFrame.transpose.html, Retrieved on: Jul. 11, 2025, 3 Pages.
"pandas.melt", Unpivot in Python Pandas (melt), Retrieved From: https://pandas.pydata.org/docs/reference/api/pandas.melt.html, Retrieved on: Jul. 11, 2025, 4 Pages.
"pandas.Series.str.slice", Python substring, Retrieved From: https://pandas.pydata.org/docs/reference/api/pandas.Series.str.slice.html, Retrieved on: Jul. 11, 2025, 3 Pages.
"pandas.Series.str.split", Python split, Retrieved From: https://pandas.pydata.org/docs/reference/api/pandas.Series.str.split.html, Retrieved on: Jul. 11, 2025, 5 Pages.
"Pivot Columns", Retrieved From: https://learn.microsoft.com/en-us/power-query/pivot-columns, May 17, 2024, 9 Pages.
"Pivot Data from Columns to Rows", Retrieved From: https://help.tableau.com/current/pro/desktop/en-us/pivot.htm, Retrieved on: Jul. 11, 2025, 10 Pages.
"Pivoting", Retrieved From: https://tidyr.tidyverse.org/articles/pivot.html, Retrieved on: Jul. 11, 2025, 40 Pages.
"Power BI", Retrieved From: https://www.microsoft.com/en-us/power-platform/products/power-bi/, Retrieved on: Jan. 2023, 6 Pages.
"Standardize Using Patterns", Retrieved From: https://help.alteryx.com/smc/r104/en/trifacta-application/common-tasks/cleanse-tasks/standardize-using-patterns.html, Retrieved on: Jul. 11, 2025, 6 Pages.
"Tables Join", Power BI forums, Retrieved From: https://community.fabric.microsoft.com/t5/Desktop/Tables-Join/m-p/631121, Feb. 25, 2019, 9 Pages.
"Transform data—Search", Power BI forums, Retrieved From: https://community.fabric.microsoft.com/t5/forums/searchpage/tab/message?filter=location&q=transformdata, Retrieved on: Jul. 11, 2025, 5 Pages.

(56) References Cited

OTHER PUBLICATIONS

"Transform table and join", Tableau forum, Retrieved From: https://community.tableau.com/s/question/0D54T00000C5tE4SAJ/transform-table-and-join, Jul. 30, 2015, 4 Pages.
"Transforming data as indicated", Power BI forum, Retrieved From: https://community.fabric.microsoft.com/t5/Power-Query/Transforming-data-as-indicated/m-p/3794251, Mar. 27, 2024, 19 Pages.
"Unpivot columns", Retrieved From: https://learn.microsoft.com/en-us/power-query/unpivot-column, Jul. 11, 2025, 13 Pages.
"Use Relationships for Multi-table Data Analysis", Retrieved From: https://help.tableau.com/current/server/en-us/datasource_multitable_normalized.htm, Retrieved on: Jul. 11, 2025, 7 Pages.
"Transform", Tableau Forum, Retrieved From: https://community.tableau.com/s/global-search/%40uri#q=transform&t=All, Retrieved on: Jul. 11, 2025, 3 Pages.
Arora, Piyush., "How to Unpivot Data?", Unpivot in Tableau, Retrieved From: https://community.tableau.com/s/question/0D54T00000C6ndgSAB/how-to-unpivot-data, Mar. 6, 2020, 3 Pages.
Barowy, et al., "Flashrelate: Extracting Relational Data from Semi-structured Spreadsheets Using Examples", In ACM SIGPLAN Notices, vol. 50, No. 6, Jun. 13, 2015, pp. 218-228.
Bavishi, et al., "AutoPandas: neural-backed generators for program synthesis", Proceedings of the ACM on Programming Languages, vol. 3, Issue OOPSLA, Oct. 10, 2019, pp. 1-27.
Brown, et al., "Language Models Are Few-shot Learners", In Repository of arXiv:2005.14165v4, Jul. 22, 2020, 75 Pages.
Chaudhuri, et al., "An Overview of Business intelligence Technology", In Journal of Communications of the ACM, vol. 54, No. 8, Aug. 1, 2011, pp. 88-98.
Chen, et al., "Fast Foreign-Key Detection in Microsoft SQL Server PowerPivot for Excel", In Journal of Proceedings of the VLDB Endowment, vol. 7, No. 13, Sep. 1, 2014, pp. 1417-1428.
Chen, et al., "Rigel: Transforming Tabular Data by Declarative Mapping", IEEE Transactions on Visualization and Computer Graphics, vol. 29, No. 1, 2022, 11 Pages.
Chen, et al., "XGBoost: A Scalable Tree Boosting System", In Proceedings of the 22nd ACM SIGKDD International Conference on Knowledge Discovery and Data Mining, Aug. 13, 2016, pp. 785-794.
Costello, Katie., "Gartner Says the Future of Self-Service Is Customer-Led Automation", Retrieved From: https://www.gartner.com/en/newsroom/press-releases/2019-05-28-gartner-says-the-future-of-self-service-is-customer-I, May 28, 2019, 3 Pages.
Gulwani, et al., "Spreadsheet Data Manipulation Using Examples", In Magazine Communications of the ACM, vol. 55, No. 8, Aug. 1, 2012, pp. 97-105.
He, et al., "Transform-data-by-example (TDE) an extensible search engine for data transformations", In Proceedings of the VLDB Endowment, vol. 11, No. 10, Jun. 1, 2018, pp. 1165-1177.
He, et al., "Transform-Data-by-Example (TDE): Extensible Data Transformation in Excel", Proceedings of the 2018 International Conference on Management of Data, Jun. 2018, pp. 1785-1788.
Jiang, et al., "Holistic Primary Key and Foreign Key Detection", In Journal of Intelligent Information Systems, vol. 54, No. 3, Jun. 1, 2020, pp. 439-461.
Jin, et al., "Auto-transform: learning-to-transform by patterns", Proceedings of the VLDB Endowment, vol. 13, No. 12, Jul. 1, 2020, pp. 2368-2381.
Jin, et al., "Foofah: Transforming Data by Example", In Proceedings of the ACM International Conference on Management of Data, May 2017, pp. 683-698.
Karp, Richard. M., "Reducibility Among Combinatorial Problems", In Publication of Springer, Mar. 20, 1972, pp. 85-103.
Kent, William., "A Simple Guide to Five Normal Forms in Relational Database Theory.", Communications of the ACM, vol. 26, No. 2, Feb. 1983, pp. 120-125.
Kimball, et al., "The Data Warehouse Toolkit: The Complete Guide to Dimensional Modeling", Published by John Wiley & Sons, Aug. 8, 2011, 447 Pages.
Kou, et al., "A fast algorithm for Steiner trees.", Acta informatica, vol. 15, Jun. 1981, pp. 141-145.
Lai, et al., "Auto-Prep: Holistic Prediction of Data Preparation Steps for Self-Service Business Intelligence", In Repository of arXiv preprint arXiv:2504.11627, Apr. 15, 2025, 20 Pages.
Lee, et al., "Lux: Always-on Visualization Recommendations for Exploratory Dataframe Workflows", arXiv preprint arXiv:2105.00121v2, Dec. 22, 2021, 15 Pages.
Lemaaztre, et al., "Imbalanced-learn: A Python Toolbox to Tackle the Curse of Imbalanced Datasets in Machine Learning", Journal of machine learning research, vol. 18, No. 17, 2017, 5 Pages.
Lewis, et al., "Retrieval-Augmented Generation for Knowledge-Intensive NLP Tasks", 34th Conference on Neural Information Processing Systems, Dec. 6, 2020, 16 Pages.
Li, et al., "Auto-Tables: Synthesizing Multi-Step Transformations to Relationalize Tables without Using Examples", In Repository of arXiv:2307.14565v2, Aug. 9, 2023, 15 pages.
Extended European search report received in European Application No. 25225697.9, mailed on Apr. 7, 2026, 06 pages.

* cited by examiner

Table 1: Fertility (fact) 302

| Country | 2010 | 2011 | 2012 |
|---|---|---|---|
| Poland | 1.38 | 1.3 | 1.3 |
| Chile | 1.86 | 1.84 | 1.83 |
| Morocco | 2.58 | 2.65 | 2.71 |
| Turkey | 2.1 | 2.08 | 2.06 |

Table 2: Date (dim) 304

| Year | IsLeap | Days |
|---|---|---|
| 2010 | No | 365 |
| 2011 | No | 365 |
| 2012 | Yes | 366 |

Table 3: Economics (fact) 306

| Line-ID | Code | Metric | Value |
|---|---|---|---|
| CY2010-CHL | CHL | GDP | 12756 |
| CY2011-CHL | CHL | GDP | 14673 |
| CY2012-CHL | CHL | GDP | 15397 |
| CY2010-CHL | CHL | CPI | 100 |
| CY2011-CHL | CHL | CPI | 103.3 |
| CY2012-CHL | CHL | CPI | 106.4 |
| CY2010-CHL | CHL | Payroll | 55.16 |
| CY2011-CHL | CHL | Payroll | 57.01 |
| CY2012-CHL | CHL | Payroll | 57.43 |

Table 4: Country (dim) 308

| Code | POL | CHL | TUR | MAR |
|---|---|---|---|---|
| Country | Poland | Chile | Turkey | Morocco |
| Continent | Europe | S. America | Europe | Africa |
| Developed | Yes | No | Yes | No |

FIG. 3A

Table 5: Fertility (fact) 310

| Country | Year | Fertility |
|---|---|---|
| Chile | 2010 | 1.3 |
| Chile | 2011 | 1.84 |
| Chile | 2012 | 2.65 |
| Turkey | 2010 | 2.08 |
| Turkey | 2011 | 2.65 |
| Turkey | 2012 | 2.08 |

Table 6: Economics (fact) 312

| Year | Code | GDP | CPI | Payroll |
|---|---|---|---|---|
| 2010 | CHL | 12756 | 100 | 55.16 |
| 2011 | CHL | 14637 | 103.3 | 57.01 |
| 2012 | CHL | 15397 | 106.4 | 57.43 |
| 2010 | TUR | 71022 | 100 | 93.29 |
| 2011 | TUR | 78102 | 102.3 | 98.10 |
| 2012 | TUR | 82019 | 104.1 | 99.38 |

Table 7: Date (dim) 314

| Year | IsLeap | Days |
|---|---|---|
| 2010 | No | 365 |
| 2011 | No | 365 |
| 2012 | Yes | 366 |

Table 8: Country (dim) 316

| Code | Country | Continent | Developed |
|---|---|---|---|
| POL | Poland | Europe | Yes |
| CHL | Chile | S. America | No |
| TUR | Turkey | Europe | Yes |
| MAR | Morocco | Africa | No |

FIG. 3B

OPTIMIZING DATA TABLE TRANSFORMATIONS AND JOINS FOR PROCESSING TOOLS

BACKGROUND

Recent years have seen an increase in the use of computing devices (e.g., mobile devices, personal computers, server devices) to create, store, edit, and share data. For example, tools and applications for creating data tables and other structured data are increasingly common. Business Intelligence (BI) tools and other data processing tools play an important role in leveraging structured data to help in making informed data-driven decisions. For example, many data processing applications generate "dashboards" by offering user-friendly, drag-and-drop interfaces that are tailored to non-technical enterprise users.

Despite these advances, however, the "data preparation" phase of such processing tools suffer various pitfalls. For example, existing data methods are inefficient because of over-reliance on domain-experts. To illustrate, existing methods rely on domain-experts to manually program both 1) data transformation steps, and 2) table join steps, before their data can be ready for dashboarding and interactive analysis. This expert-driven approach is largely inaccessible to average users.

Additionally, existing methods for automatically predicting data transformations and table joins are inaccurate. For example, large groups of data tables often require various transformations prior to ingestion into a dashboard interface. Similarly, these groups of data tables frequently require joins across data tables before the dashboard interface can display analytical information. While predictive tools exist for both data table transformations and data table joins, these predictive tools operate on tables in isolation and often lead to inaccurate results when utilized in sequence.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

BRIEF DESCRIPTION OF THE DRAWINGS

FIGS. 3A and 3B illustrate an example of how an original set of tables can be transformed and joined to facilitate dashboarding in accordance with one or more embodiments.

DETAILED DESCRIPTION

Figure 1:
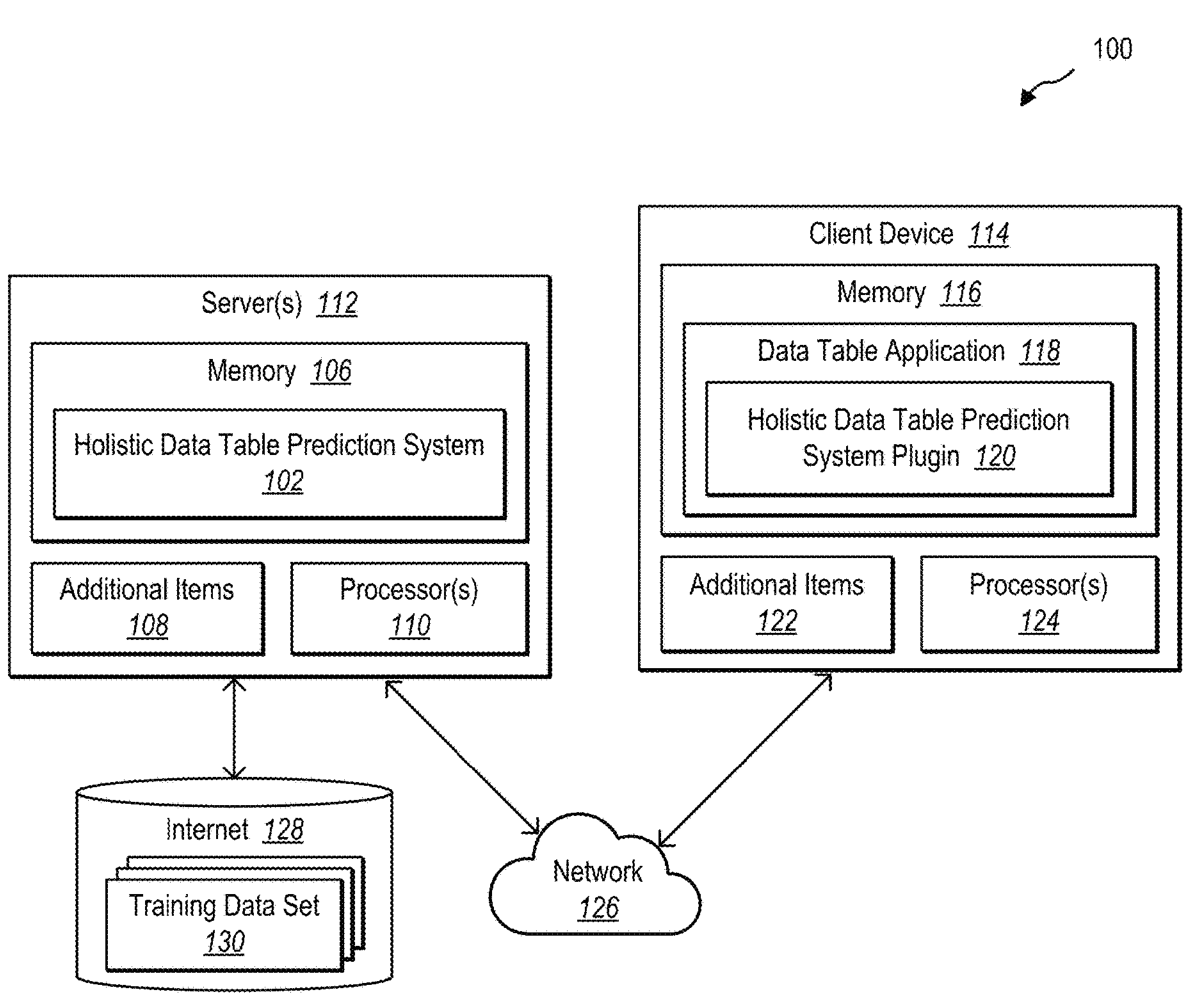
FIG. 1 illustrates an example overview of a digital environment where a holistic data table prediction system operates in connection with a client device to jointly predict table transformations and joins in a data preparation phase of a business intelligence tool.

The present disclosure relates to systems and methods for holistically predicting data preparation steps for data tables as part of self-service business intelligence tools. As discussed above, existing data preparation systems can predict data table transformations and joins in isolation-treating both processes as separate problems. To illustrate, existing table join prediction models assume that the input tables are already properly transformed prior to predicting how the tables can be joined. Similarly, existing table transformation prediction models consider each table in a group individually, without taking into account any signals from related tables or how various transformations among the tables may affect joinability. As such, existing transformation and prediction systems give results that fail to jointly boost the prediction accuracy for both transformations and joins within a group of data tables.

To solve these problems, a holistic data table prediction system discussed herein reasons across transformations and joins within a set of data tables to increase the accuracy of transformation and join predictions. For example, the holistic data table prediction system jointly predicts both transform and join steps in the data preparation phase of BI. In one or more embodiments, the holistic data table prediction system performs this joint prediction by generating a graph representation that seamlessly integrates diverse classes of transformations and joins, using a probabilistic interpretation of these steps, which are represented as weighted edges within the graph.

This graph-based approach leveraged by the holistic data table prediction system leads to transformation and join predictions that are more accurate than those made by existing systems that only consider transformations and joins as separate problems. For example, by predicting data table transformations in isolation from possible join considerations, existing systems frequently predict and perform data table transformations that make the underlying data tables harder or even impossible to join together.

Moreover, the inaccuracies that frequent existing systems can lead to general computational waste. For example, the gear-grinding that commonly arises in the face of inaccurate transformation and join predictions lead to data pipeline bottlenecks and other application-level errors when used in the BI and other processing and/or data presentation spaces. Computing resources are wasted as system processes time-out, applications are restarted, input data is re-compiled, and so forth while data preparation processes hang and get stuck because data tables have been transformed in such a way that they can no longer be joined. Often, resolving these issues requires technical expertise that an average user does not have. As such, the holistic data table prediction system also increases the efficiency of the computing system where it operates because it improves the accuracy and operability of the data transformation steps by jointly predicting both transformations and joins within a set of data tables.

In one or more implementations, the methods and steps performed by the unsupervised error detection system reference multiple terms. For example, as used herein, a "data table" or "dataset" refers to a collection of data. Typically, data tables are organized in a structured format with rows and columns. Often, data within the same column or column domain adheres to the same column constraint, while data within the same row is part of the same record.

As used herein, a "transformation" refers to any change to the structure, format, or content of a data table. In one or more embodiments, a data table transformation can reshape a data table (e.g., changing rows into columns and vice versa), can aggregate or sort data within columns or rows of a data table, and so forth. Generally, transforming a data table makes the data table more useful or suitable for any of a variety of types of analysis.

As used herein, a "join" refers to a data table operation that combines rows from two or more tables based on a related column between them. Generally, joins are used to retrieve and manipulate data spread across multiple tables.

Figure 2:
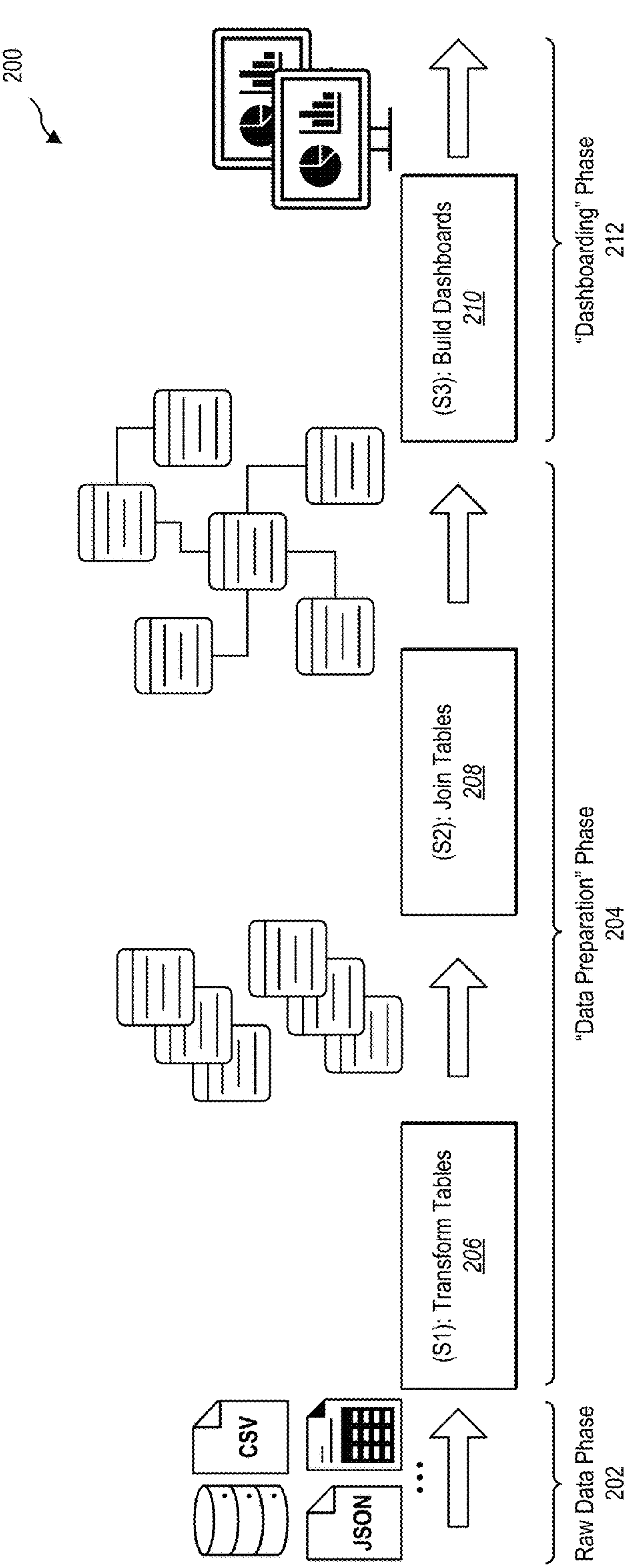
FIG. 2 illustrates an overview of steps taken by a processing tool in generating a data "dashboard" in accordance with one or more embodiments.

Additional details regarding example implementations of the holistic data table prediction system will now be discussed in connection with the following figures. To illustrate, FIG. 1 provides an example overview of a networked environment where the holistic data table prediction system operates to jointly predict both transformations and joins across a set of data tables during data preparation. FIG. 2 illustrates typical steps taken during a processing tool's ingestion of data to generate a data "dashboard," while FIGS. 3A-3B illustrate an example set of tables and transformations and joins that may be performed on those tables.

Figure 4:
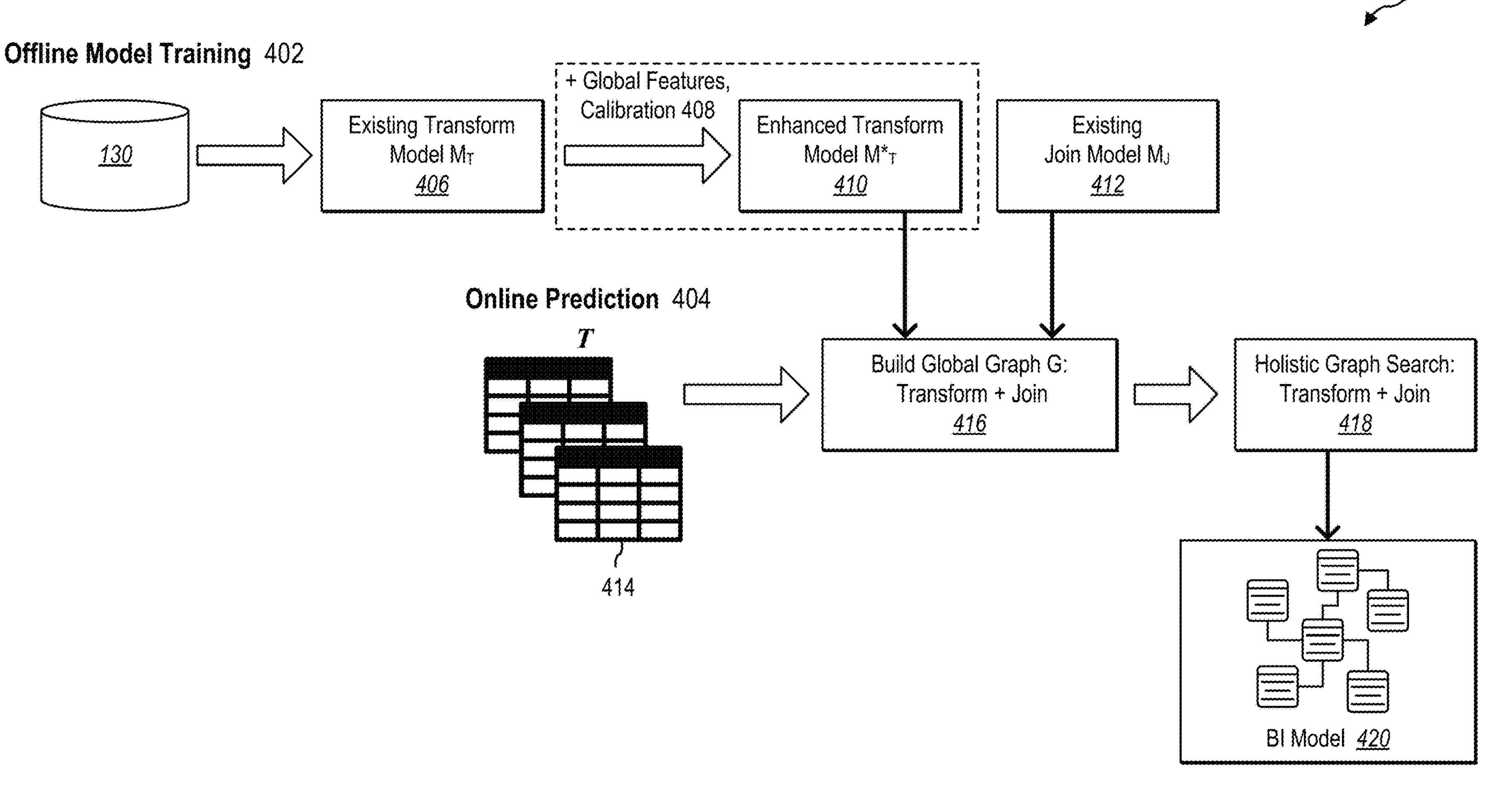
FIG. 4 illustrates an overview sequence of steps taken by the holistic data table prediction system during an offline model training phase and an online prediction phase in accordance with one or more embodiments.
Figure 5:
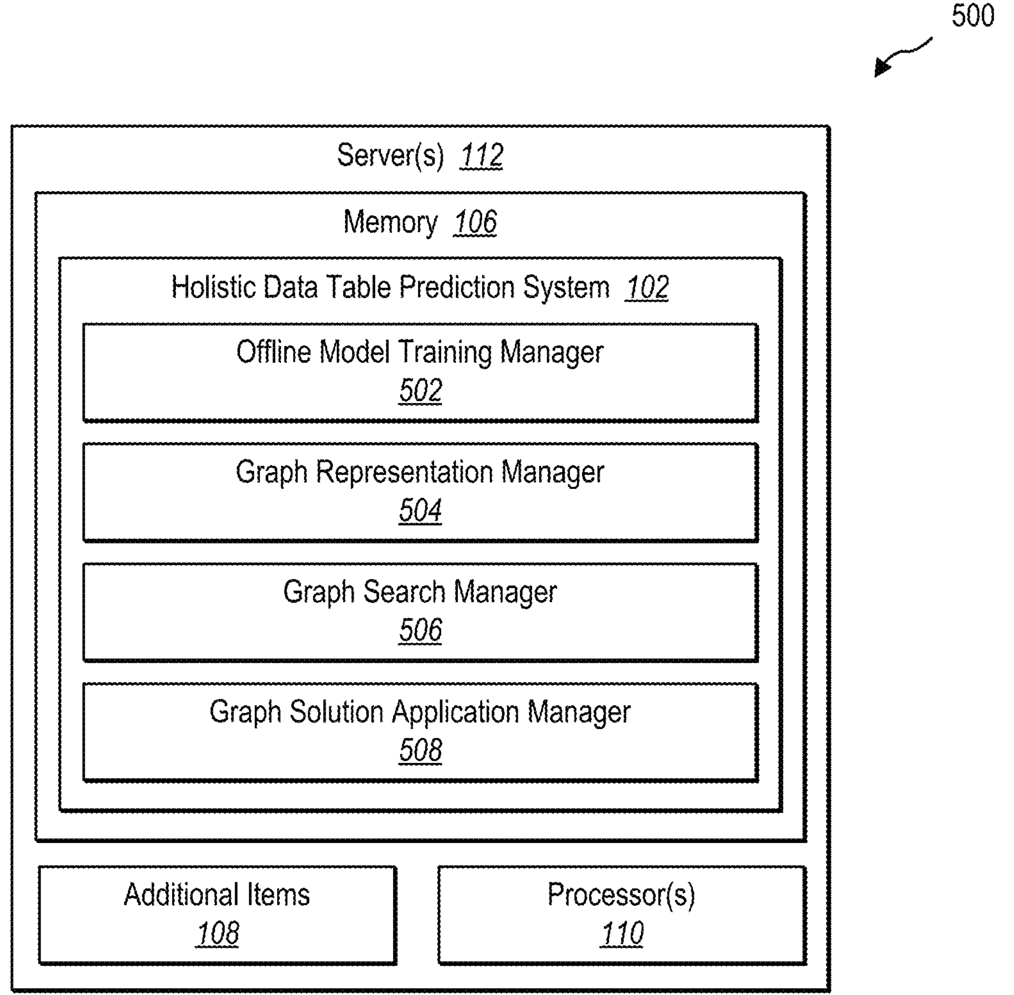
FIG. 5 illustrates a block diagram of the holistic data table prediction system operating within a server in accordance with one or more embodiments.
Figure 6:
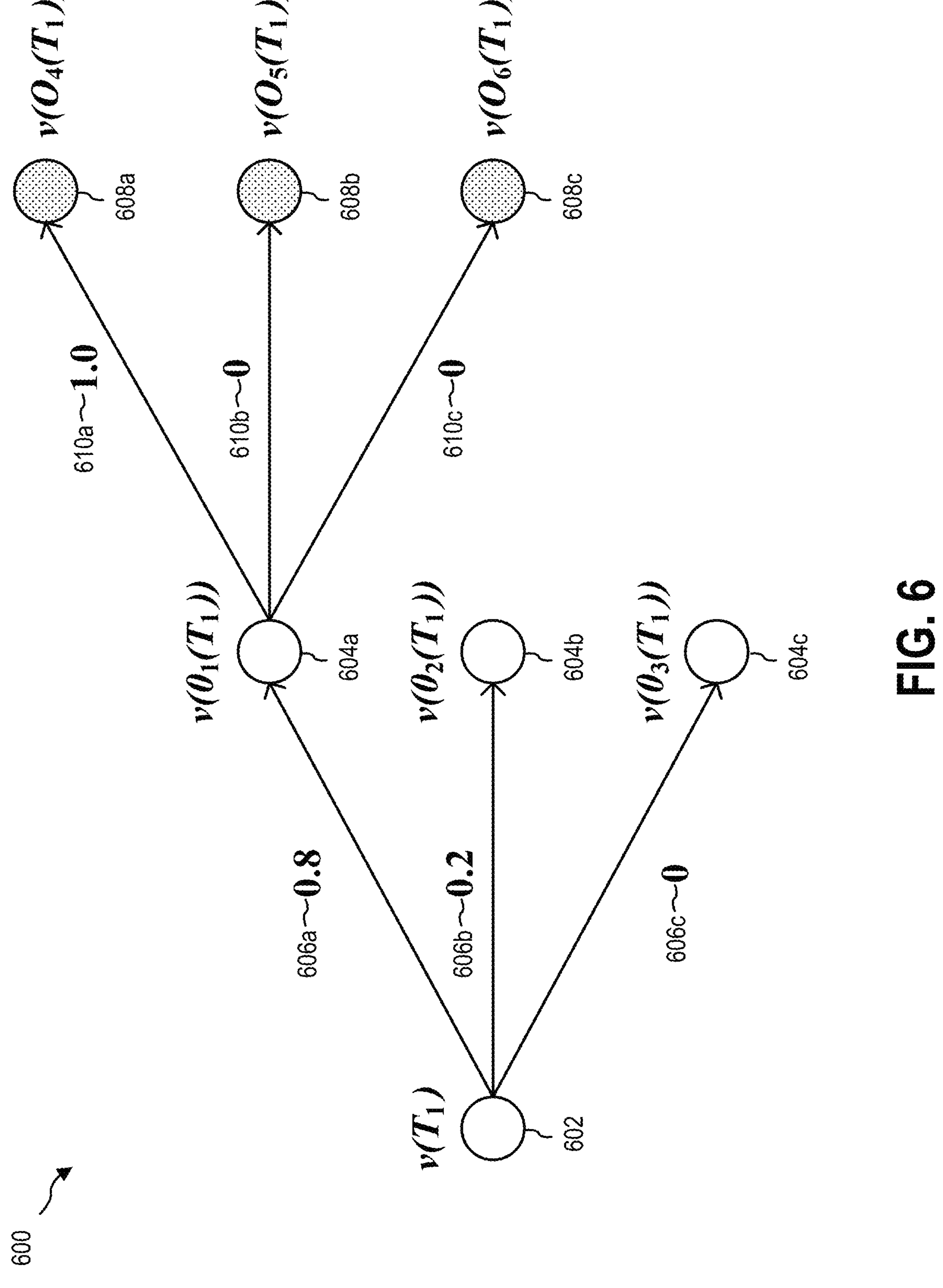
FIG. 6 illustrates a transformation tree generated by the holistic data table prediction system in accordance with one or more embodiments.
Figure 8:
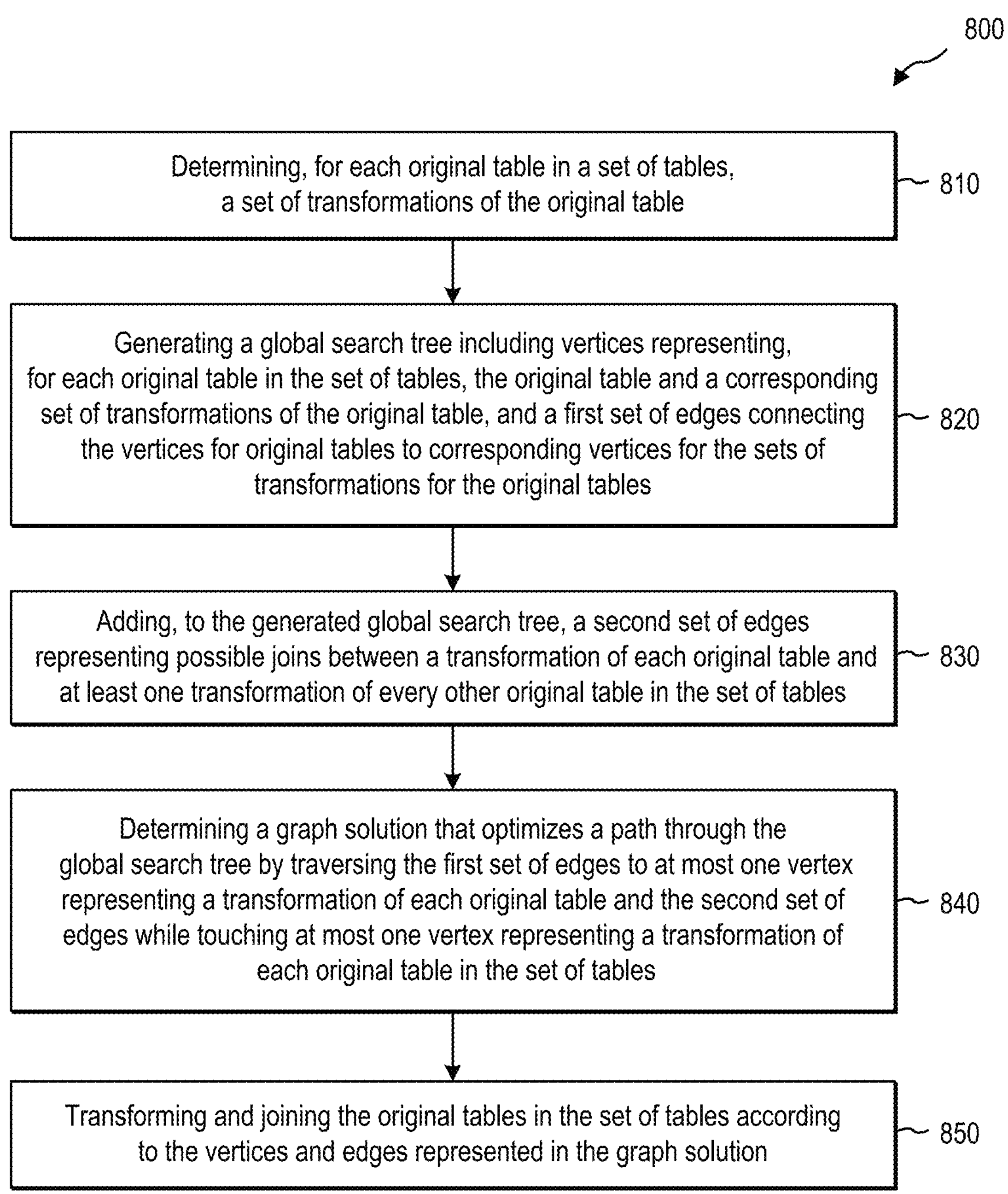
FIG. 8 illustrates a series of acts for jointly predicting table transformations and joins for a set of tables in accordance with one or more embodiments.
Figure 9:
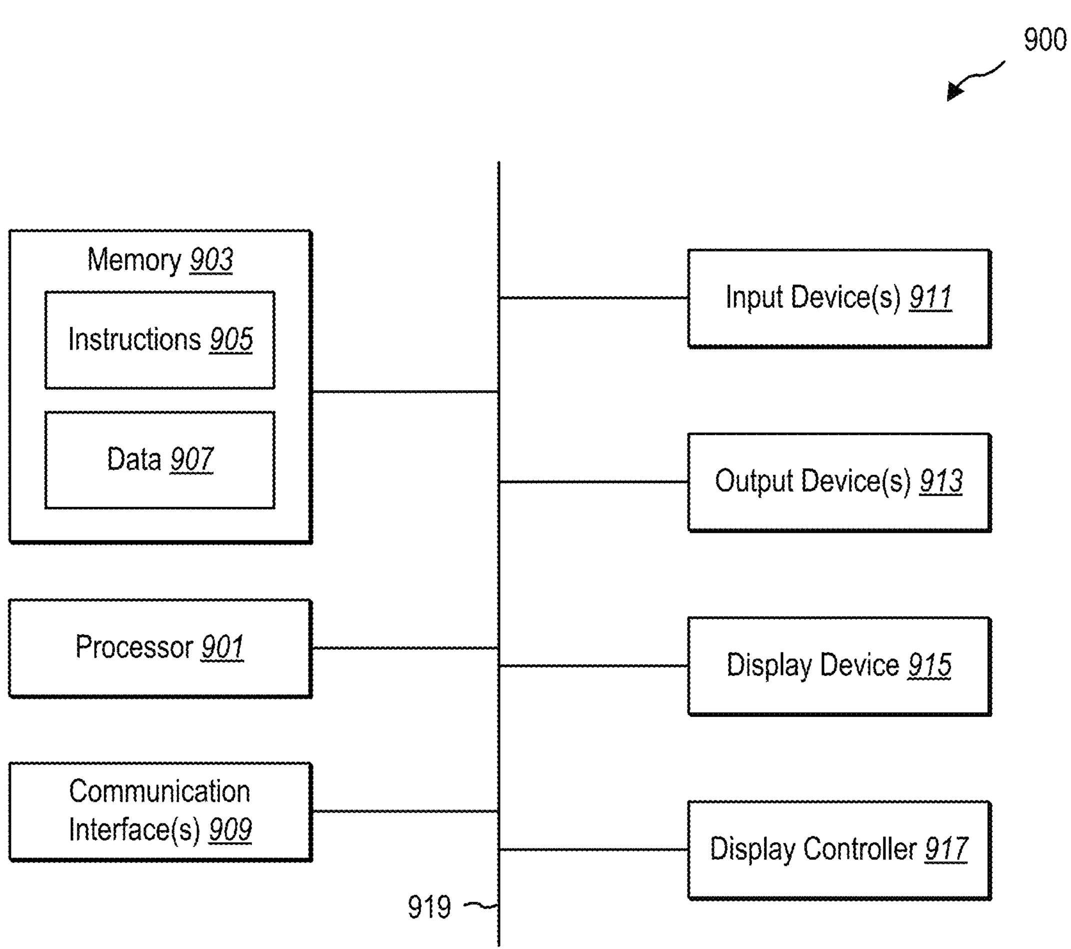
FIG. 9 illustrates certain components that may be included within a computer system in accordance with one or more embodiments.

FIG. 4 shows an overview of steps taken by the holistic data table prediction system to jointly predict transformations and joins across tables within a set of tables, and FIG. 5 illustrates additional detail with regard to those steps. FIGS. 6-7C provide yet further detail with regard to the global search tree generated and solved by the holistic data table prediction system to optimize a sequence of transformations and joins on an input set of tables. FIG. 8 illustrates a set of steps taken by the holistic data table prediction system in jointly predicting transformations and joins on a set of tables, while FIG. 9 provides additional detail in connection with a computing machine.

As just mentioned, FIG. 1 illustrates an example overview environment 100 including a holistic data table prediction system 102 operating within a memory 106 on a server(s) 112. As further shown in FIG. 1, the holistic data table prediction system 102 works in combination with a holistic data table prediction system plugin 120 operating as part of a data table application 118 within a memory 116 on a client device 114. In addition to the memories 106, 116, the server(s) 112 and the client device 114 can also include additional items 108, 122, and processor(s) 110, 124, respectively.

In one or more embodiments, the holistic data table prediction system 102 crawls the Internet 128 to gather a training dataset 130. For example, the training dataset 130 can include any of a vast number of publicly available data tables, .csv files, and other structured datasets. In one or more embodiments, the holistic data table prediction system 102 operates under an assumption that the training dataset 130 is largely error-free.

As further shown in FIG. 1, the holistic data table prediction system 102 and the holistic data table prediction system plugin 120 may be communicatively coupled through the network 126. In one or more implementations, the network 126 may represent any type or form of communication network, such as the Internet, and may include one or more physical connections, such as a LAN, and/or wireless connections, such as a WAN.

Although FIG. 1 illustrates components of the environment 100 in one arrangement, other arrangements are possible. For example, in one embodiment, the holistic data table prediction system 102 may provide data preparation services directly to the data table application 118 without the holistic data table prediction system plugin 120 being installed on the client device 114. In that embodiment, the data table application 118 may provide a dataset including multiple data tables to the holistic data table prediction system 102 and the holistic data table prediction system 102 can jointly predict transformations and joins in connection with the dataset. The holistic data table prediction system 102 can then provide instructions to the data table application 118 for updating a dashboard based on the transformed and joined dataset.

In yet further embodiments, the holistic data table prediction system 102 may exist as part of the data table application 118. For example, the holistic data table prediction system 102 may be programmed into the data table application 118. Additionally, the overview environment 100 may include any number of client devices 114. Furthermore, in some embodiments, the features and functionality of the holistic data table prediction system 102 may be spread across multiple servers within the environment 100.

FIG. 2 illustrates an overview diagram 200 of typical phases in generating a data dashboard as part of a drag-and-drop interface application. For example, in a raw data phase 202, a typical data processing and presentation system (in one or more implementations referred to as a BI system) can gather raw data from any of multiple sources. In more detail, the BI system can gather raw data from database tables, flat files such as CSV files, and so forth. The BI system can gather this information from dedicated servers, the internet 128, or other sources.

Since the raw data can be gathered in any of a variety of formats, typical BI systems often utilize a data preparation phase 204 to bring the raw data into a standardized and usable format. For example, in the data preparation phase 204, a typical BI system often performs a first step 206 of transforming tables and a second step 208 of joining tables. In one or more embodiments, the first step 206 of transforming tables generally includes converting data files into proper tables by relationalizing data and by standardizing values. Additionally, in one or more embodiments, the second step 208 of joining tables generally includes linking transformed tables that are related together via join relationships. Both of the first step 206 and the second step 208 are discussed in greater detail below in connection with FIGS. 3A and 3B.

Once the raw data has been transformed and joined into a standardized format, typical BI systems then move into a dashboarding phase 212. For example, a typical BI system performs a step 210 of building dashboards by ingesting the transformed and joined data tables and utilizing the join relationships between the data tables to build interactive dashboard tools. To illustrate, a BI dashboard generally displays data visualizations and analytics on a single screen. Often, BI dashboards are customizable and include real-time data that enable users to make better decisions and strategic plans.

FIGS. 3A and 3B illustrate additional detail in connection with transforming and joining data tables. For example, as shown in FIG. 3A, a BI system may gather the data tables 302, 304, 306, and 308 to build BI dashboards to visualize how birth rates and economic statistics changed in different countries over time. In one or more embodiments, the table 302 and the table 306 are "fact tables" that contain key numerical measures of interest (e.g., fertility rates and economic readings). Additionally, the table 304 and the table 308 are "dimension tables" whose primary keys (e.g., "Year" and "Country") can join with corresponding foreign key attributes in the fact tables. Once joined, the BI system can enable aggregations over these dimensional attributes (e.g., for questions such as: "In which decade and which continent is fertility the highest?").

In their initial formats, the tables 302-308 are not ready for analysis for several reasons. For example, the year values are presented as column headers in the table 302 (e.g., "Fertility") using a cross-tabulated format. As such, it is impossible to join the table 302 with the table 304 across the "Year" column in the table 304. Similarly, even though the table 308 (e.g., "Country") needs to join with the table 302 (e.g., "Fertility") and the table 306 (e.g., "Economics"), the table 308 (e.g., "Country") is not shaped in the right direction to make such joins possible. Furthermore, the table 306 (e.g., "Economics") contains different types of economic readings (e.g., "GDP," "CPI," "Payroll," etc.), which are stored as key-value pairs in the columns "Metric" and "Value." To be visualized, these pairs need to be "lifted" into separate columns. Finally, the "Year" column of the table 306 (e.g., "Economics") has a "Line-ID" column that uses the calendar-year-country-code format (e.g., "CY2010-CHL"). Before a join can be performed between the table 306 (e.g., "Economics") and the table 304 (e.g., "Date"), the values in the "Line-ID" column need to be transformed into a standardized format (e.g., "2010").

A typical BI system utilizes human intuition to identify and plan for these transformations and joins before any analysis can be performed. In one or more embodiments, multiple types of transformations can be applied to a data table. For example, possible transformations can include table-reshaping transformations, as string transformations within a data table and other types of transformations including a "no-op" or non-transformation.

In more detail, table-reshaping transformations can include transformations such as unpivot, pivot, and transpose. For example, an unpivot transformation collapses a set of selected columns into one single column, while keeping the remaining columns unchanged. A pivot transformation is the inverse operator of unpivot, which lifts values in a column into column headers. A transpose transformation converts rows to columns and vice versa.

Additionally, string transformations within a data table operate on values in the same row and do not alter the shape of the data table. Such string transformations can include a split transformation, a concatenate transformation, and a substring transformation. In one or more embodiments, a split transformation uses a given delimiter parameter to separate an input string into an array of segments. Once a segment is then selected using a predetermined parameter to produce an output string. A concatenate transformation is the reverse of a split transformation and pieces multiple strings together into one output string. Finally, a substring transformation selects a sub-part of a string column based on a starting position parameter and length parameter.

Additional data table transformations can include transformations that are more "cosmetic" in nature and do not affect cross-table analysis. Such additional transformations may include, but are not limited to, change column types, remove/reorder columns, and row-to-row transformations to reformat/beautify column values. Furthermore, as mentioned above, a "no-op" transformation may also be considered a transformation by the holistic data table prediction system 102. In one or more embodiments, a "no-op" transformation results in no changes to an original data table.

Once data tables in a collection have been transformed, a typical BI system can utilize a human expert to perform one or more joins within the collection of data tables. In one or more embodiments, a join operation combines rows from two or more tables based on a related column between them. Common types of joins can include a inner join (e.g., returns records that have matching values in both tables), a left or left-outer join (e.g., returns all records from the left table and the matched records from the right table), a right or right-outer join (e.g., returns all records from the right table and the matched records from the left table), a full or full-outer join (e.g., returns all records when there is a match in either left or right table), and a cross join (e.g., returns the Cartesian product of the two tables by combining all rows from the first table with all rows from the second table).

Returning to FIG. 3B, a typical BI system can utilize a human expert to generate the tables 310, 312, 314, and 316 from the transformed and joined tables 302-308 shown in FIG. 3A. In more detail, a seasoned BI expert can identify the transformations and joins needed to bring the tables 302-308 into the correct shape and format to be ingested by the BI system. For example, the human expert can perform an unpivot transformation on the table 302 (e.g., the "Fertility" table) so that the years become a new column in the transformed table 310 (e.g., the "Fertility" table shown in FIG. 3B). With this transformation, the table 310 becomes joinable with the "Year" column in the dimensional table 314 (e.g., the "Date" table).

Additionally, the BI expert can perform a transpose transformation on the table 308 (e.g., the "Country" table) to produce the table 316 (e.g., the "Country" table shown in FIG. 3B), which becomes joinable with both the table 310 (e.g., the transformed "Fertility" table) through the "Country" column, and the table 312 (e.g., the transformed "Economics" table) through the "Code" column.

Furthermore, the BI expert can perform a pivot transformation on the table 306 (e.g., the "Economics" table) to produce the table 312 (e.g., the "Economics" table as shown in FIG. 3B), which has standalone metrics (e.g., GDP, CPI, etc.) for various analyses. Finally, the BI expert can perform a split string transformation on the "Line-ID" column of the table 306 (e.g., the "Economics" table) which splits the field using a delimiter "-." This string transformation takes the first component and then uses substring to extract the last 4 characters to produce a new "Year" column in the table 312 (e.g., the "Economics" table shown in FIG. 3B). This transformation makes the table 312 joinable with the "Year" column of the table 314 (e.g., the transformed "Date" table shown in FIG. 3B).

With the tables 310-316 appropriately transformed, the BI expert could then join or link the tables 310-316 to complete the second step 208 (e.g., the join step). In one or more embodiments, the joins among the tables 310-316 can occur across the common columns. For example, the tables 310, 312, and 314 can be joined across the "Year" column. Similarly, the tables 310 and 316 can be joined across the "Country" column, and the tables 312 and 316 can be joined across the "Code" column. In at least one embodiment, these join relationships can create a "BI model" from which dashboards can be built using drag-and-drop interfaces.

While this transformation and joining process is intuitive to a human BI expert, these same steps are challenging for a non-technical user. As mentioned above, some existing BI systems leverage prediction models for the transformation and join steps of the data preparation phase 204. Existing prediction models, however, predict transformations and joins in isolation. For example, existing prediction models treat transformations and joins as two separate and standalone problems. To illustrate, existing join prediction models assume that input tables are already properly transformed/structured, and therefore do not consider transformations that would need to happen in conjunction with joins—as is typically part of human intuition as discussed above in connection with FIGS. 3A and 3B. Similarly, existing transformation prediction models operate on individual tables making predictions on one table at a time in isolation without taking into account signals from related tables or how predicted transformations may affect joinability.

For this reason, the holistic data table prediction system 102 optimizes a holistic approach to data preparation that jointly predicts both transformations and joins across a set of data tables to improve the accuracy of both types of predictions. FIG. 4 illustrates an architectural overview 400 of steps taken by the holistic data table prediction system 102 in jointly predicting most-likely transformation steps and join steps across a set of data tables 414 to generate a BI model 420 that can be used in drag-and-drop dashboarding BI applications. For example, as shown in FIG. 4, the holistic data table prediction system 102 can perform an offline model training step 402 as well as an online graph-based prediction step 404. Each of these steps 402, 404 will now be discussed in detail.

In the offline model training step 402, the holistic data table prediction system 102 can utilize the training dataset 130 to train one or more existing transformation models 406 ($M_T$) as well as one or more existing join models 412 ($M_J$). The holistic data table prediction system 102 can further generate an enhanced transformation model 410

$$(M_T^+)$$

utilizing global features and calibration 408.

In the online graph-based prediction step 404, the holistic data table prediction system 102 considers both transformations and joins across the input set of data tables 414. Specifically, the holistic data table prediction system 102 constructs a graph G in a step 416 with each table from the set of data tables 414 as a vertex and with both candidate transformations or joins as edges that are weighted by their probability scores using the enhanced transformation model 410

$$(M_T^+)$$

and the join model 412 ($M_J$). The holistic data table prediction system 102 then solves the graph in a step 418 to generate a list of most-likely data table transformations and joins. Finally, by enacting these most-likely transformations and joins on the set of data tables 414, the holistic data table prediction system 102 generates the BI model 420.

As mentioned above, and as shown in FIG. 5, the holistic data table prediction system 102 jointly predicts both transformations and joins across a set of data tables to improve the accuracy of both types of predictions. FIG. 5 is a block diagram 500 of the holistic data table prediction system 102 operating within the server(s) 112 during both the offline model training step 402 and the online graph-based prediction step 404 as discussed above. As such, FIG. 5 provides additional detail with regard to these functions. For example, as shown in FIG. 5, the holistic data table prediction system 102 can include an offline model training manager 502, a graph representation manager 504, a graph search manager 506, and a graph solution application manager 508.

In certain implementations, the holistic data table prediction system 102 may represent one or more software applications, modules, or programs that, when executed by a computing device, may cause the computing device to perform one or more tasks. For example, and as will be described in greater detail below, one or more of the offline model training manager 502, the graph representation manager 504, the graph search manager 506, or the graph solution application manager 508 may represent software stored and configured to run on one or more computing devices, such as the server(s) 112. Any of the offline model training manager 502, the graph representation manager 504, the graph search manager 506, or the graph solution application manager 508 shown in FIG. 5 may also represent all or portions of one or more special purpose computers to perform one or more operations.

In one or more embodiments, the holistic data table prediction system 102 finds the most likely data preparation steps, defined as the most likely transformations for each input table (which could be a no-op transformation), so that the cross product of the probabilities of these transformations, together with the join probability of all transformed tables, can be maximized. In at least one embodiment, this problem can be given a formal definition. For example, given a set of input tables $T=\{T_i|i\in[n]\}$, and a space of transformation operators O={no-op, transpose, unpivot, pivot, split, concatenate, substring, . . . }, where each operator $O\in$ O can be parameterized as O(P), using parameter P drawn from a space of parameters P. For each input table $T_i\in T$, let $S_i=(O_1(P_1), O_2(P_2), O_3(P_3), \ldots)$ be a candidate sequence of appropriately parameterized transformations on $T_i$, and let $p(S_i|T_i)$ be the probability of transformations $S_i$ given the input table $T_i$. Denote by $S_i(T_i)$ the transformed version of $T_i$, $S=\{S_i|i\in[n]\}$ the set of all transformations for each $T_i\in T$, and $S(T)=\{S_i(T_i)|i\in[n]\}$ the set of all transformed tables. Finally, let J(S(T)) be the candidate joins found on the transformed S(T).

As such, the holistic data table prediction system 102 seeks to find the optimal set of transformations S*, such that the overall transformation probability, written as $p(S|T)=\Pi_{i\in[n]}p(S_i|T_i)$, and the join probability of S(T), written as p(J(S(T))), are jointly maximized:

$$\begin{aligned} S^* &= \arg\max_S\ p(S|T)\cdot p(J(S(T))) \\ &= \arg\max_S\left(\prod_{S_i\in S} p(S_i|T_i)\right)\cdot p(J(S(T))) \end{aligned}$$

The main challenge addressed by the holistic data table prediction system 102, however, lies in the need to jointly optimize both transformations and joins across all tables so that the predicted transformation S not only have high transformation probability, but also the transformed tables S(T) should have high join probabilities.

This need is important because greedily finding the most likely transformations and joins in isolation often leads to sub-optimal solutions. For example, looking back at the tables 302-308 shown in FIG. 3A, recall that the desired transformations for tables 302-308, denoted as $S_1$-$S_4$, are:

$S_1$=(Unpivot ("2010", "2012"))

$S_2$=(no-op)

$S_3$=(Pivot ("Metric", "Value"), Substring (Split ("Line-ID", "-") [0]), 2, 4)

$S_4$=(Transpose( ))

Let S*={S1, S2, S3, S4} be a candidate solution, and let the transformation probability of $p(S_1|T_1)$, $p(S_2|T_2)$, $p(S_3|T_3)$, $p(S_4|T_4)$ be 0.8, 0.8, 0.8, and 0.4, respectively. Given S*, the overall transformation probability $p(S^*|T)$ is therefore $(0.8)^3 \cdot 0.4 \cdot 0.9=0.18$, and the overall objective function $S^*=\arg\max_S p(S|T) \cdot p(J(S(T)))$ is $(0.8)^3 \cdot 0.4 \cdot 0.9=0.18$.

In an alternative embodiment, suppose there is an alternative transformation for $T_4$, $S'_4$=(no-op) (or not transposing $T_4$), which has a slightly higher probability $p(S'_4|T_4)=0.6$, when only $T_4$ is considered in isolation. If transformations are optimized separately from the joins, $S^-=\{S_1, S_2, S_3, S'_4\}$ may be found to have better transformation probability, $p(S^-|T)=0.8^3 \cdot 0.6$, which is greater than $p(S^*|T)=(0.8)^3 \cdot 0.4$.

Despite this, as discussed above, the holistic data table prediction system 102 jointly considers joins along with transformations. As such, the join probability of $p(J(S^-(T)))=0.5$, which is considerably inferior to $p(J(S^*(T)))=0.9$, because the no-op on $T_4$ leads to worse overall joins. In other words, $T_4$ cannot join with other tables, leading to inferior join connectivity that is reflected in a lower $p(J(S^-(T)))=0.5$, compared to transposing $T_4$ into table 316, as shown in FIG. 3B, that can enable more join-connectivity and results in a higher $p(J(S^*(T)))=0.9$.

Since the holistic data table prediction system 102 is searching transformation and join candidates across all tables simultaneously, the resulting search space can become quickly intractable. This is because there are multiple transformation operators, and each operator can have thousands of possible parameter combinations. Given n input tables that need to be jointly optimized, a naïve search would yield an enormous search space. As such, and as will be described in greater detail below, the holistic data table prediction system 102 utilizes principled graph optimization to efficiently solve this search problem.

As mentioned above, and as shown in FIG. 5, the holistic data table prediction system 102 includes the offline model training manager 502. In one or more embodiments, the offline model training manager 502 trains both the existing join models 412 and the existing transformation models 406. Additionally, the offline model training manager 502 looks at all input tables holistically, which often provides global-level signals across tables to help identify desired transformation classifiers $M_T$. As such the offline model training manager 502 leverages these global-level features to re-train the enhanced transformation model 410 (e.g., the enhance transformation model $M^+_T$) to better estimate $p(S|T)=\Pi_{i\in[n]}p(S_i|T_i))$.

In one or more embodiments, the offline model training manager 502 trains and enhances the one or more existing transformation models 406 ($M_T$). As discussed above, the offline model training manager 502 estimates the transformation probability $p(S|T)=\Pi_{i\in[n]}p(S_i|T_i))$. Given that each $S_i$ is a sequence of parameterized transformations $S_i=\{O_1, O_2, O_3, \ldots\}$, the offline model training manager 502 can in turn estimate the probability $p(S_i|T_i)$ as:

$$p(S_i|T_i) = p(O_1|T_i) \cdot p(O_2|O_1(T_i)) \cdot p(O_3|O_2(O_1((T_i)))$$

Where each $p(O|T)$ estimates the probability of transformation O given table T.

As mentioned above, the offline model training manager 502 builds on top of one or more existing transformation models 406 ($M_T$), and uses the same $p(O|T)$ abstraction to estimate the probability of each transformation O. The offline model training manager 502 performs additional enhancement after observing that the holistic data table prediction system 102 operates on a set of tables T in the BI setting (as opposed to one individual table), which presents opportunities to use global signals from all tables in T, to better identify desired transformations.

To illustrate, as discussed above in connection with FIGS. 3A and 3B, the table 308 (e.g., "Country") is best transformed using transformation $S_4$=(Transpose( )). Despite this, it may not be clear—looking at the table 308 alone—whether a Transpose is required. However, the strong overlap between the first row of table 308 (e.g., "Country") and the "Country" column of the table 302 (e.g., "Fertility"), together with the overlap between the second row of table 308 and the "Code" column in the table 306 (e.g., "Economics"), provides global-level signals from other tables indicating that the table 308 (e.g., "Country") is not oriented correctly and a "Transpose" is required.

As such, the offline model training manager 502 develops a number of global-level features leveraging all tables in T, which results in the enhanced transformation model 410 ($M^+_T$), which makes the existing transformation models 406 globally-aware. Some of the key global features considered by the offline model training manager 502 include: (1) column-header-overlap that captures the column-header overlap between table $T_i$ and other tables $T_j \in T\backslash\{T_i\}$ in the same BI project; (2) value-domain-overlap that captures how much column value domain overlap between table $T_i$ and other tables $T_j \in T\backslash\{T_i\}$; and (3) headers-values-overlap that captures the overlap between column-header of $T_i$ and other column values of $T_j \in T\backslash\{T_i\}$. All these global-level features provide the offline model training manager 502 with signals for whether column-headers are oriented correctly and whether reshaping operators like transpose may be needed.

Additionally, in one or more embodiments, the offline model training manager 502 trains the one or more existing join models 412 ($M_J$). For example, the offline model training manager 502 can determine $p(J(S(T)))$, which estimate the "goodness" of joins on the set of transformed tables S(T) induced by S, as part of the objective function. The offline model training manager 502 uses the one or more existing join models 412 ($M_J(C, C')$ defined on pairs of columns C, C', to estimate the join probability p(T, T') for a pair of tables (T, T') as:

$$p(T, T') = \max_{C\in T, C'\in T'} M_J(C, C')$$

Which is the maximum join probability for any pair of columns $C\in T$, $C'\in T'$, to estimate the goodness of join p(T, T').

In one or more embodiments, the offline model training manager 502 uses probability calibration to ensure that $M_J(C, C')$ and p(T, T') are true probabilities in [0, 1], where 1 indicates complete confidence that tables corresponding to T, T' should join, 0 indicates complete confidence that the two tables should not join, and 0.5 is right on the decision boundary and indicates that the model is ambivalent on whether the two tables should join. The offline model training manager 502 therefore uses $\theta=0.5$ as the cutoff for whether two tables should join.

As mentioned above, and as shown in FIG. 5, the holistic data table prediction system 102 further includes the graph representation manager 504. In one or more embodiments, the graph representation manager 504 operates in the online graph-based prediction step 404 represents the entire search space for the BI problem including transformation steps, join paths, and all transformed or original tables on a graph in a unified manner. In at least one embodiment, the graph representation manager 504 represents all possible transformations for one table $T \in \mathbf{T}$, as a tree denoted by G(T).

To illustrate, for the transformation tree G(T), let $T \in \mathbf{T}$ be an input table, $O \in \mathbf{O}$ be a predicted transformation on T, with probability $p(O|T)$. Let O(T) be a transformed version of T after applying O, and O'(O(T)) in turn be a transformed version of O(T) after applying O', up to m-levels deep. In at least one embodiment, the graph representation manager 504 uses m=2.

The graph representation manager 504 can construct a weighted tree G(T)=V(T), E(T)) to represent all possible transformations from T as follows. The graph representation manager 504 represents the original input table T as a vertex v(T), which is the root of G(T). The graph representation manager 504 represents all T's transformed descendants O(T), $\forall O \in \mathbf{O}$, also as vertices, written as v(O(T)). The graph representation manager 504 connects v(O(T)) and v(T) with edges e(O)=v(T), v(O(T)) to represent the transformation O on T, where the edge weight w(e(O)) is the transformation probability $P(O|T)$. Similarly, the graph representation manager 504 recursively represents all O(T)'s transformed descendants, O'(O(T)) also as vertices v(O'(O(T))), which are connected to v(O(T)) using edge e(O, O')=v(O(T), v(O'(O(T))), with edge weight $P(O'|O(T))$. The resulting G(T)=V(T), E(T) is the transformation tree for one table T, where V(T) and E(T) are defined as:

$$V(T) = \{v(T)\} \cup \{v(O(T)) | \forall O \in \mathbf{O}\} \cup \{v(O'(O(T))) \big| \forall O, O' \in \mathbf{O}\}$$

$$E(T) = \{(v(T), v(O(T)) | \forall O \in \mathbf{O}\} \cup \{(v(O(T)), v(O'(O(T))) | \forall O', O \in \mathbf{O}\}$$

To illustrate, FIG. 6 shows an example transformation tree 600 (G(T)) associated with the table 302 (e.g., "Fertility" as shown in FIG. 3A). As shown in FIG. 6, the table 302 is denoted "$T_1$." In one or more embodiments, the graph representation manager 504 generates the transformation tree 600 representing all possible candidate transformations on $T_1$ (e.g., the table 302).

First, as shown in FIG. 6, the graph representation manager 504 represents the "Fertility" table 302 (e.g., $T_1$) as a root node 602 ($v(T_1)$). In one or more embodiments, the candidate transformations on $T_1$ include $O_1$=Unpivot ("2010," "2012"), $O_2$=no-op, $O_3$=Transpose( ), etc., where $O_1$ is the desired transformation on $T_1$, to produce $O_1(T_1)$ (e.g., that corresponds to the transformed table 310 shown in FIG. 3B). As such, the graph representation manager 504 represents these candidate transformations in the transformation tree 600 as a vertex $v(O_i(T_1))$ (e.g., the vertices 604*a*, 604*b*, 604*c*, etc.).

In one or more embodiments, the graph representation manager 504 connects each transformation $O_i$ with an edge (e.g., edges 605*a*, 605*b*, 605*c*, etc.) from $v(T_1)$ (e.g., the root node 602), weighted by transformation probability $p(O_i|T_1)$ (e.g., the probabilities 606*a*, 606*b*, 606*c*, etc.) in the transformation tree 600 (e.g., $G(T_1)$). For example, for the candidate transformation 01=Unpivot, the transformation probability $p(O_1|T_1)$ is 0.6. It follows that the edge-weight between $v(T_1)$ and $v(O_1(T_1))$ is $p(O_1|T_1)=0.6$ indicated by the weight 606*a* on the transformation edge 605*a* between the root node 602 and the transformation vertex 604*a*.

It will be understood that each transformed table $O_i(T_i)$ can be transformed again, which corresponds to another level in the transformation tree 600. As such, the second-level vertices 608*a*, 608*b*, and 608*c* represent further transformations of the transformed table represented by the transformation vertex 604*a*. The second-level edges 607*a*, 607*b*, and 607*c* are weighted with the weights 610*a*, 610*b*, and 610*c* representing the transformation probabilities for each transformation. It follows that each transformation represented in the transformation tree 600 can have multiple sub-trees representing further transformations.

In one or more embodiments, the graph representation manager 504 can next generate a global search graph (G(T)) that represents both transformations and joins by connecting all transformation trees (G(T)), $\forall T \in \mathbf{T}$, to construct the global search graph G(T). For example, let G(T)=(V(T), E(T)) be the transformation tree for each $T \in \mathbf{T}$. The graph representation manager 504 constructs a global search graph G(T)=(V(T), E(T)) to represent all tables T. Here, the vertex set $V(\mathbf{T}) = \cup_{T \in \mathbf{T}} V(T)$ is the union of all vertices in each transformation-tree G(T) (e.g., the transformation tree 600 shown in FIG. 6), whereas the edge set $E(\mathbf{T}) = E_T(\mathbf{T}) \cup E_J(\mathbf{T})$ is defined as having two types of edges:

1) Transformation-edges $E_T(\mathbf{T}) = \cup_{T \in \mathbf{T}} E(T)$, which is the union of all transformation edges E(T) in G(T), where each edge represents a transformation with its edge-weight set as its transformation probability, or $w(e)=p(O|T)$; and
2) Join-edges $E_J(\mathbf{T}) = \{(v, v') | v \in V_{leaf}(T), v' \in V_{leaf}(T')\}$, where each edge (v, v') stands for a possible join between the two tables represented by the leaf vertices $v \in V_{leaf}(T)$, $v' \in V_{leaf}(T')$, $T \neq T'$, with edge-weight set as the join-probability, or $w(e)=p(v, v')$ if $p(v, v')>0.5$, or $w(e)=0.5$ otherwise In one or more embodiments, for join-edges, the graph representation manager 504 can set the edge-weight w(e) as the join probability p(v, v') if p(v, v')>0.5, and 0.5 otherwise. This is because the join probability $p(v, v') \in [0,1]$ is calibrated true probability from the join model $M_J$, where 1 is complete confidence that tables for v, v' should join, 0 is complete confidence that the two tables should not join, and 0.5 is on the decision boundary and the model is ambivalent on whether the two tables should join.

Figure 7A:
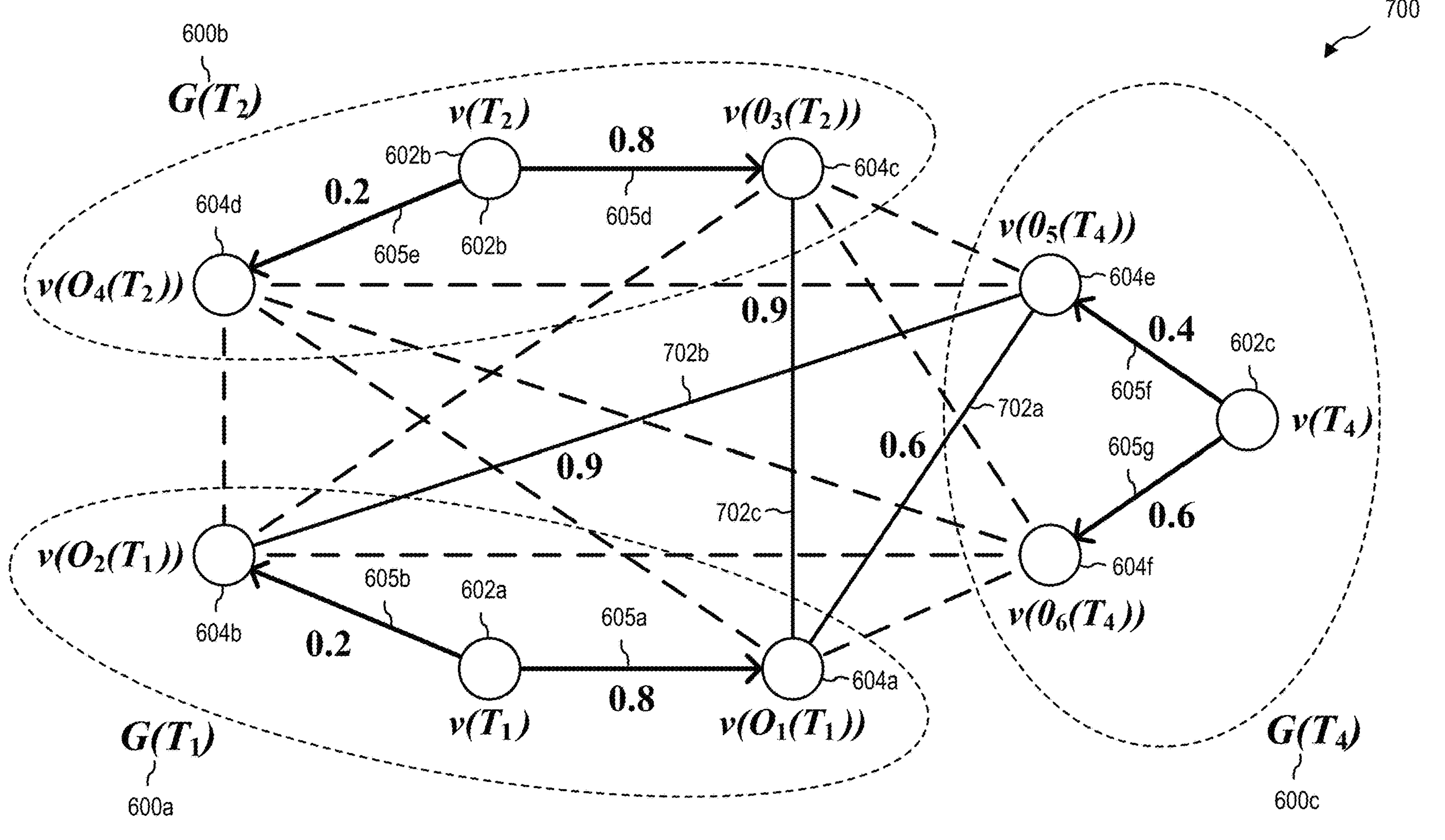
FIGS. 7A, 7B, and 7C illustrate global search trees and graph solutions generated by the holistic data table prediction system in accordance with one or more embodiments.

To illustrate how the graph representation manager 504 generates a global search tree (G(T)), FIG. 7A shows a global search tree 700 generated by the graph representation manager 504 from the tables 302-308 shown in FIG. 3A. For simplicity, FIG. 7A only shows on level of transformations for each transformation-tree 600*a* (e.g., the transformation tree 600 ($G(T_1)$) shown in FIG. 6), the transformation tree 600*b* ($G(T_2)$), and the transformation tree 600*c* ($G(T_4)$)—marked in separate dashed circles in FIG. 7A—and omits the transformations for the table 306 ($T_3$) since it involves a two-level transformation that is too big to show in a single figure.

In one or more embodiments, the graph representation manager 504 constructs join edges $E_J(\mathbf{T})$ in G(T) (e.g., the join edges 702*a*, 702*b*, 702*c*) between the vertices 604*a*-604*f*. Note that the graph representation manager 504 does not construct join edges including the root nodes 602*a*, 602*b*, 602*c* in the global search tree 700 as the un-transformed tables are represented by "no-op" transformation vertices. In one or more embodiments, the graph representation manager 504 constructs the join edges $E_J(T)$ in G(T) by invoking the join models $M_J$ to score the joinability of each pair of tables. As such, the graph representation manager 504 constructs the join edges between any vertices (v, v') at the leaf-level of two different transformation trees 600 (G(T) and G(T')). In at least one embodiment, the graph representation manager 504 requires the joined vertices (v, v') to come from two different transformation trees (G(T) and G(T')) because self-joins between transformed versions of the same table are uncommon.

As shown in FIG. 7A, the graph representation manager 504 uses solid lines to indicate join edges (e.g., the join edges 702*a*-702*c*) between joinable tables with join-probability p(v, v')>0.5. Conversely, the graph representation manager 504 uses dashed lines to indicate "placeholder join-edges" between tables that do not join, whose edge-weights are set to w(e)=0.5, so that the relative "goodness" of their non-joinable scores will not influence overall joining decisions.

Returning to FIG. 5, as mentioned above, the holistic data table prediction system 102 further includes the graph search manager 506. In one or more embodiments, the determines the optimal transformations and joins of an input set of tables (e.g., the tables 302-308 shown in FIG. 3A) by solving the global search tree 700 generated by the graph representation manager 504. Recall that the graph representation manager 504 constructs the global search tree 700 representing $p(S|T)=\Pi_{S_i \in S} p(S_i|T_i)$, which directly measures the probability of all transformations on the input set of tables. The global search tree 700 also represents p(J(S(T))) to measure the probability of joins on the transformed tables S.

In one or more embodiments, as shown in FIG. 7A, the graph representation manager 504 generates the global search tree 700 including join relationships that follow star/snowflake-like schemas, where for n input tables, exactly n−1 join edges need to exist to form stars/snowflakes, which would connect all n tables. As such the graph search manager 506 quantifies the probability (e.g., the "goodness") of the joins between tables in S(T) with n tables using the n−1 most confident join edges that can "connect all tables, denoted as J. The graph search manager 506 further uses their overall join-probability as the "goodness of joins p(J(S(T))).

In graph terms and in G(T), the set of join edges J is defined as J={(v, v')|}

$$p(J(S(T))) = \prod_{e(v,v')\in E_J} w(e)$$

In one or more embodiments, the graph search manager 506 finds the optimal set of transformations $S^*=\{S_i|i\in[n]\}$, such that the overall join probability and transformation probability are maximized. A valid solution would have one transformation sequence for each $T_i \in T$, and a set of table joins of the transformed tables. Given G, transformations are uniquely defined by each vertex, representing a transformed table. Intuitively, a valid solution on G would have exactly one path for each $G(T_i)$, uniquely defined by its end node $v(S(T_i))$, or transformed tables, and the table joins are the join edges between the end nodes. In at least one embodiment, the graph search manager 506 assumes minimal connectivity between tables in T, meaning that a valid solution has exactly (n−1) join edges to connect $\{T_i|i\in[n]\}$.

In one or more embodiments, a valid solution G'=(V', E') is a subgraph of G defined as follows. V' is the union of vertices on paths is the $$\{S_i|i\in[n]\}.\ E' = E'_T \cup E'_J$$

union of transformation edges on paths $\{S_i|i\in[n]\}$ and a set of join edges. Let $\{v(S(T_i))|i\in[n]\}$, or the set of the end node of the selected paths, represent the selected transformed tables.

$$E'_J$$

is between two selected transformed tables, and $$|E'_J| = (n-1).$$

Figure 7B:
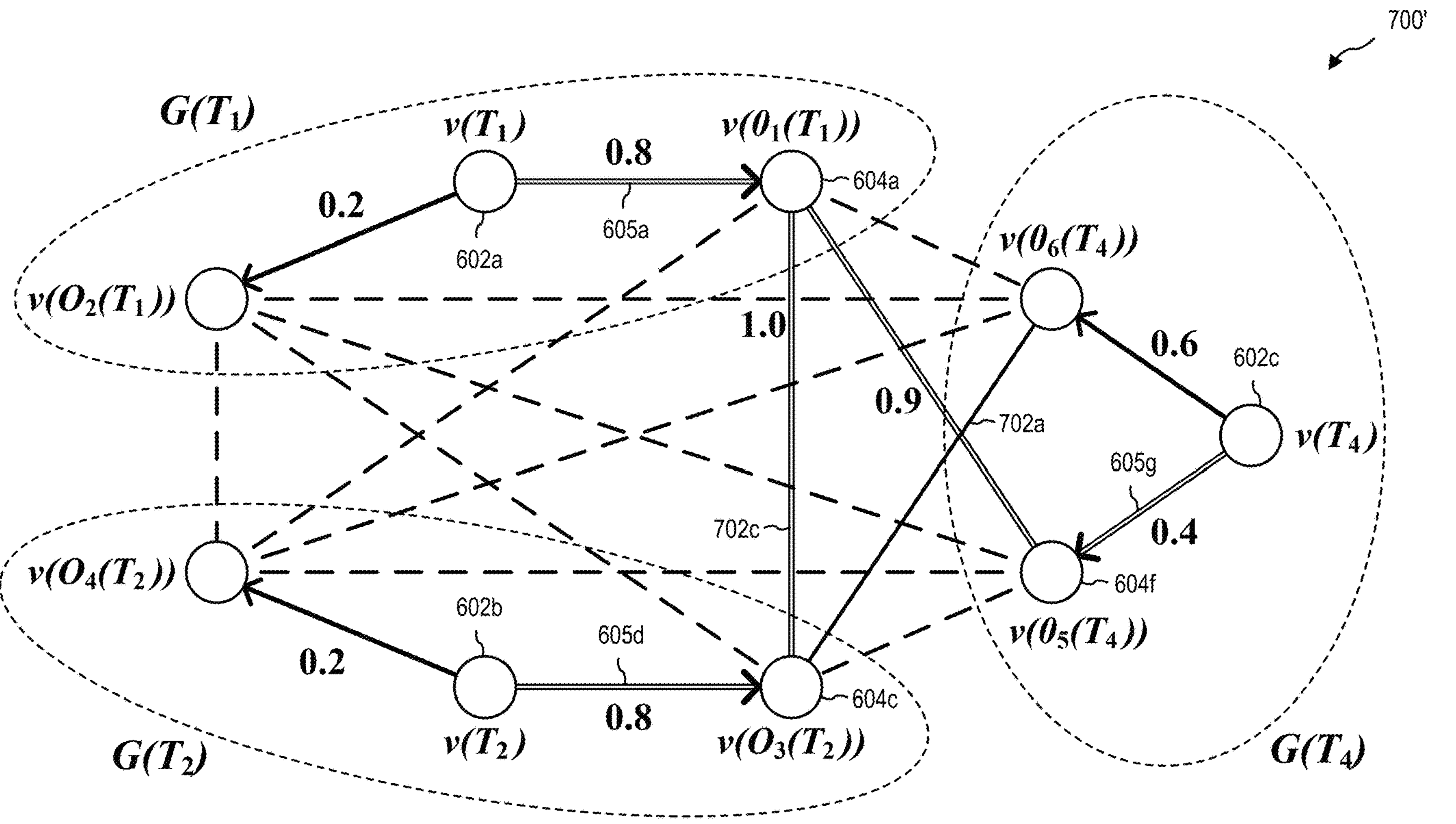
Figure 7C:
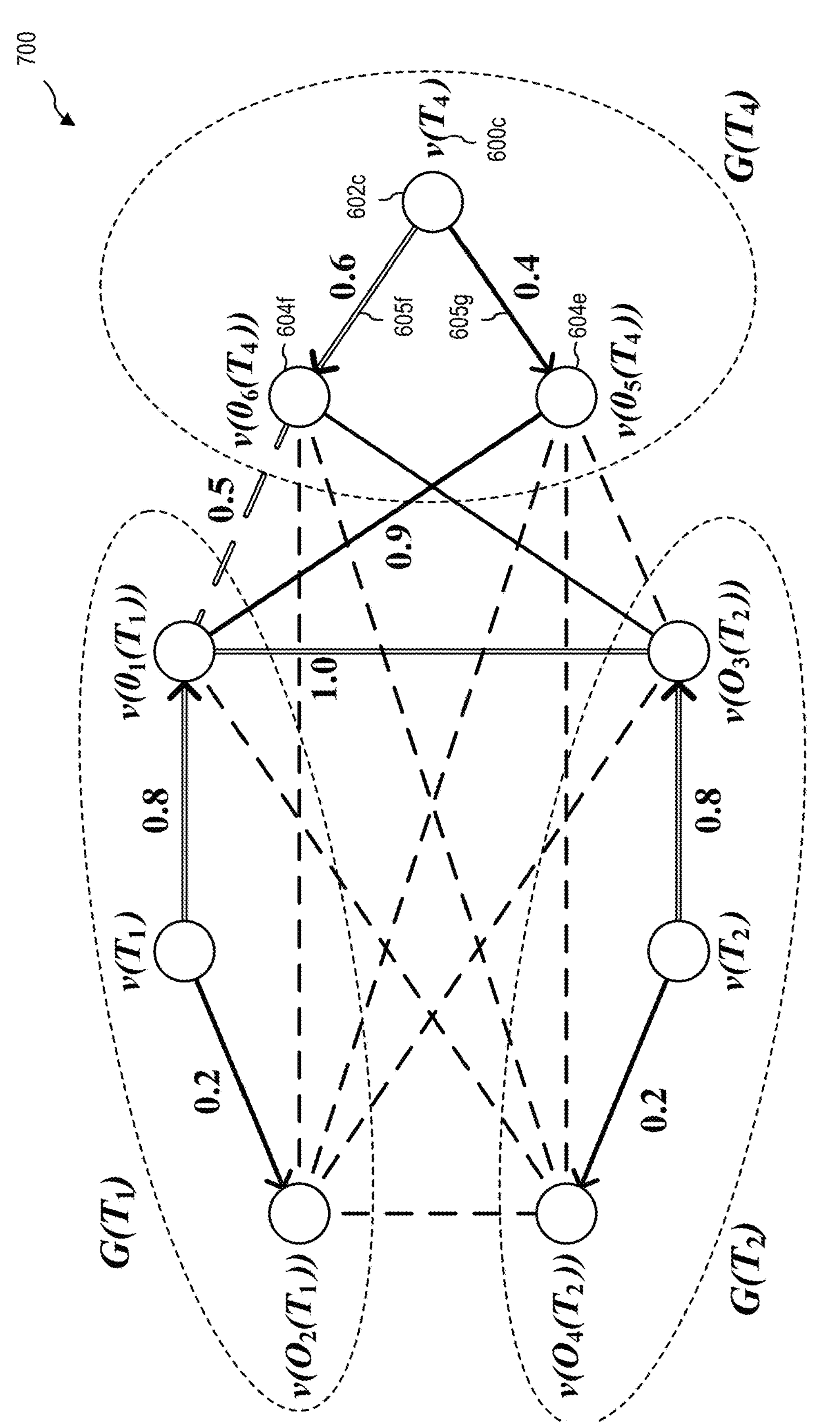

To illustrate, FIG. 7B shows how the graph search manager 506 finds a valid solution, global search tree 700' (G') on G (e.g., the global search tree 700). For example, the global search tree 700' (G') has exactly one path for each $G(T_i)$. For $G(T_1)$, $S_1=(O_1)$ is the selected path (e.g., indicated by the transformation edge 605*a*), whose end node (e.g., transformation vertex 604*a* or $v(S_1(T_1))$), representing the transformed $T_i$ (e.g., the root node 602*a*). Likewise, in the global search tree 700', $v(S_4(T_2))$ (e.g., represented by the vertex 604*c* connected by the transformation edge 605*d* to the root node 602*b*) is the transformed $T_2$ (e.g., represented by the root node 602*b*). Similarly, $v(S_6(T_3))$ (e.g., represented by the transformation vertex 604*f* connected by the transformation edge 605*g* to the root node 602*c*) is the transformed $T_4$ (e.g., represented by the root node 602*c*).

As shown in FIG. 7B, the global search tree 700' (e.g., G') has $$|E'_J| = (n-1) = 2$$

join edges (e.g., the join edges 702*a* and 702*c*) that connect three tables, thereby satisfying the minimal connectivity. All of $$e \in E'_J$$

are between two end nodes, where $e(v(S_1(T_1)), v(S_4(T_2))$ is a model-predicted join edge (e.g., the join edge 702*a*) with a weight of 0.9.

In one or more embodiments, the graph search manager 506 defines the search problem as given a directed, weighted graph G=(V, E) and a set R, where V is the set of vertices in G, $E=E_T \cup E_J$ is the set of transformation and join edges in G, and $R \subseteq V$ is the set of root nodes $R=\{v(T_i), \ldots\}$, the graph search manager 506 will find a valid solution G*=(V*, E*) that spans R with exactly (|R|−1) join edges and maximal total weight of its join and transformation edges.

In some embodiments, the global search tree 700' is similar to a Steiner tree. For example, in Steiner trees, given an undirected distance graph G=(V, E, d) and a set R, where V is the set of vertices in G, E is the set of edges in G, d is a distance function which maps E into the set of non-negative numbers and $R \subseteq V$ is a subset of vertices of V, the minimal Steiner tree is a tree of G that spans R with minimal total distance of its edges.

However, the global search tree 700' represents key differences from the Steiner tree. For example, the minimal Steiner tree formulation does not distinguish between $E_T$ and $E_J$ and does not guarantee that the solution has exactly $(|R|-1)$ join edges. As such, the graph search manager 506 applies a different distance formula to $e_{ij} \in E_J$. In addition to the logarithmic transformation on the edge weight $w(e_{ij})$, the graph search manager 506 adds a small multiplicative factor $\beta$, where $\beta$ is smaller than $w(e_{ij})$, $\forall e_{ij} \in E_T$.

$$d(e_{ij}) = -\log(w(e_{ij})) \times \beta$$

As discussed throughout, the holistic data table prediction system 102 jointly predicts transformations and joins across a set of data tables to increase the accuracy of both types of predictions. FIG. 7C illustrates an example of how this joint prediction improves the accuracy of both types of predictions. For example, starting at the starting at the root node 602*c* within the global search tree 700*c* ($G(T_4)$), the transformation represented by the transformation vertex 604*f* (e.g., $v(O_6(T_4))$ has a greater probability (e.g., 0.6 indicated by the weighted transformation edge 605*f*) than the probability for the transformation represented by the transformation vertex 604*e* (e.g., $v(O_5(T_4))$, which is 0.4 (e.g., indicated by the weighted transformation edge 605*g*).

By jointly considering joinability with these transformations, the graph search manager 506 can determine that while the probability associated with the transformation vertex 604*f* is greater, the resulting transformed table would be unjoinable with any other table transformation represented in the global search tree 700. It is only by considering joins along with transformations that the graph search manager 506 can determine that the transformation represented by the transformation vertex 604*e* is a better choice, even though the probability or "goodness" is lower.

Thus, as shown in FIG. 7B, the graph search manager 506 can determine a graph solution (e.g., indicated by the solid, bolded edges within the global search tree 700') that traverses the global search tree 700'. As shown the graph search manager 506 determines the graph solution that includes a path through the global search tree 700' while touching at least one transformation vertex for each root node and traveling over join edges that maximize the join probabilities between those vertices.

Returning to FIG. 5, and as mentioned above, the holistic data table prediction system 102 further includes the graph solution application manager 508. In one or more embodiments, the graph solution application manager 508 transforms and joins original tables from an input table set (e.g., the set of data tables 414 shown in FIG. 4) according to the vertices and edges represented in the graph solution generated by the graph search manager 506. For example, the graph solution application manager 508 can determine a sequence including one or more transformations for each data table in the input table set indicated by the transformation vertices in the graph solution. The graph solution application manager 508 can then map those transformation vertices to their actual transformations (e.g., pivot, unpivot, no-op) for their associated root nodes or original tables. In at least one embodiment, the graph solution application manager 508 performs the indicated transformations on the associated original tables.

Once the original tables are transformed according to the graph solutions, the graph solution application manager 508 can further join the transformed tables according to the graph solution. For example, the graph solution application manager 508 can join one or more transformed tables according to the join edges in the graph solution. To illustrate, the graph solution application manager 508 can determine the vertices joined by each join edge in the graph solution. The graph solution application manager 508 can then join the transformed tables associated with the vertices in the graph solution as indicated by the join edges. The resulting transformed and joined tables are now ready to be used by a drag-and-drop business intelligence dashboarding tool.

As further shown in FIG. 5, the server(s) 112 can include additional items 108. In one or more embodiments, the additional items 108 can include data and models utilized by the holistic data table prediction system 102 in jointly predicting table transformations and joins. For example, the additional items 108 can include the one or more existing transformation models 406 and the one or more existing join models 412. Additionally, the additional items 108 can include the enhanced transformation model 410 generated by the holistic data table prediction system 102, as discussed above.

In one or more embodiments, the server(s) 112 includes the memory 106 and the processor(s) 110. For example, the memory 106 can generally represent any type or form of volatile or non-volatile storage device or medium capable of storing data and/or computer-readable instructions. In one example, the memory 106 may store, load, and/or maintain one or more components of the holistic data table prediction system 102. Examples of the memory can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Additionally, the processor(s) 110 can generally represent any type or form of hardware-implemented processing units capable of interpreting and/or executing computer-readable instructions. In one implementation, the processor(s) 110 may access and/or modify one or more components of the holistic data table prediction system 102. Examples of the processor(s) 110 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As mentioned above, FIG. 8 illustrates an example series of acts 800 related to jointly predicting data table transformations and joins for a set of input data tables. While FIG. 8 illustrates acts according to one or more embodiments, alternative embodiments may omit, add to, reorder, and/or modify any of the acts shown in FIG. 8. The acts of FIG. 8 can be performed as part of a method. Alternatively, a non-transitory computer-readable medium can include instructions that, when executed by one or more processors, cause a computing device to perform the acts of FIG. 8. In still further embodiments, a system can perform the acts of FIG. 8.

As illustrated in FIG. 8, the series of acts 800 includes an act 810 of determining, for each original table in a set of tables, a set of transformations of the original table. For example, the set of transformations of the original table can include table-reshaping transformations or string-transformations. In at least one embodiment, the set of transformations can further include a no-op transformation. In some embodiments, the table-reshaping transformations include one or more of an unpivot transformation, a pivot transformation, or a transpose transformation. Additionally, in some embodiments, the string-transformations include one or more of a split string-transformation, a concatenate string-transformation, or a substring string-transformation.

Additionally, as illustrated in FIG. 8, the series of acts 800 includes an act 820 of generating a global search tree including vertices representing, for each original table in the set of tables, the original table and a corresponding set of transformations of the original table, and a first set of edges connecting the vertices for original tables to corresponding vertices for the sets of transformations for the original tables. In one or more embodiments, the series of acts 800 further includes adding first weights to the first set of edges, wherein the first weights represent transformation probabilities that the original tables will be transformed into transformations represented by vertices connected to the corresponding first edges.

As illustrated in FIG. 8, the series of acts 800 includes an act 830 of adding, to the generated global search tree, a second set of edges representing possible joins between a transformation of each original table and at least one transformation of every other original table in the set of tables. In one or more embodiments, the series of acts 800 further includes adding second weights to the second set of edges, wherein the second weights represent join probabilities that the transformations represented by the vertices connected by the corresponding second edges will be joined.

As illustrated in FIG. 8, the series of acts 800 includes an act 840 of determining a graph solution that optimizes a path through the global search tree by traversing the first set of edges to at most one vertex representing a transformation of each original table and the second set of edges while touching at most one vertex representing a transformation of each original table in the set of tables. For example, determining the graph solution can include identifying a path through the first set of edges and the second set of edges that jointly maximizes both the transformation probabilities of the original tables in the set of tables and join probabilities between the transformations of the original tables.

As illustrated in FIG. 8, the series of acts 800 includes an act 850 transforming and joining the original tables in the set of tables according to the vertices and edges represented in the graph solution. For example, transforming the and joining the original tables based on the graph solution can include transforming each original table based on the corresponding transformed vertex in the graph solution. Additionally, joining the transformed table based on the vertices joined by the edges in the graph solution.

FIG. 9 illustrates certain components that may be included within a computer system 900. One or more computer systems 900 may be used to implement the various devices, components, and systems described herein.

The computer system 900 includes a processor 901. The processor 901 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for jointly predicting optimal transformations and joins across a set of tables comprising:

determining, for each original table in the set of original tables, a set of transformations of the original table;

generating a global search tree including vertices representing, for each original table in the set of original tables, the original table and a corresponding set of transformations of the original table, and a first set of edges connecting the vertices for original tables to corresponding vertices for the sets of transformations for the original tables, the first set of edges having associated transformation weights associated with probabilities of the transformations from the original tables;

adding, to the generated global search tree, a second set of edges representing possible joins between a transformation of each original table and at least one transformation of every other original table in the set of tables;

determining a graph solution that optimizes a path through the global search tree by traversing the first set of edges to at most one vertex representing a transformation of each original table and the second set of edges while touching at most one vertex representing a transformation of each original table in the set of tables, wherein determining the graph solution includes, for each original table from the set of original tables:

identifying a first edge from the first set of edges associated with a transformation having an associated transformation weight;

identifying a second edge from the second set of edges associated with a join operation having an associated join probability; and determining a path through the global search tree including the first edge and the second edge based on a combination of the associated transformation weight and the associated join probability; and for each original table from the set of original tables, executing the transformation associated with the first edge and the join operation associated with the second edge based on the determined path through the global search tree.

2. The method as recited in claim 1, wherein the set of transformations of the original table comprises one or more of table-reshaping transformations or string-transformations.

3. The method as recited in claim 2, wherein table-reshaping transformations comprise one or more of an unpivot transformation, a pivot transformation, or a transpose transformation.

4. The method as recited in claim 2, wherein string-transformations comprise one or more of a split string-transformation, a concatenate string-transformation, or a substring string-transformation.

5. The method as recited in claim 1, wherein the set of transformations of the original table further comprises a no-op transformation.

6. The method as recited in claim 1, wherein the first weights are represented by vertices connected to the corresponding first edges.

7. The method as recited in claim 6, further comprising adding second weights to the second set of edges, wherein the second weights represent join probabilities that the transformations represented by the vertices connected by the corresponding second edges will be joined.

8. The method as recited in claim 7, wherein determining the path through the global search tree includes jointly maximizing both the transformation probabilities of the original tables in the set of tables and join probabilities between the transformations of the original tables.

9. A system comprising:

at least one processor;

memory in electronic communication with the at least one processor; and instructions stored in memory, the instructions being executable by the at least one processor to:

determine, for each original table in a set of original tables, a set of transformations of the original table;

generate a global search tree including vertices representing, for each original table in the set of original tables, the original table and a corresponding set of transformations of the original table, and a first set of edges connecting the vertices for original tables to corresponding vertices for the sets of transformations for the original tables, the first set of edges having associated transformation weights associated with probabilities of the transformations from the original tables;

add, to the generated global search tree, a second set of edges representing possible joins between a transformation of each original table and at least one transformation of every other original table in the set of tables;

determine a graph solution that optimizes a path through the global search tree by traversing the first set of edges to at most one vertex representing a transformation of each original table and the second set of edges while touching at most one vertex representing a transformation of each original table in the set of tables, wherein determining the graph solution includes, for each original table from the set of original tables:

identifying a first edge from the first set of edges associated with a transformation having an associated transformation weight:

identifying a second edge from the second set of edges associated with a join operation having an associated join probability; and determining a path through the global search tree including the first edge and the second edge based on a combination of the associated transformation weight and the associated join probability; and for each original table from the set of original tables, execute the transformation associated with the first edge and the join operation associated with the second edge based on the determined path through the global search.

10. The system as recited in claim 9, wherein the set of transformations of the original table comprises one or more of table-reshaping transformations or string-transformations.

11. The system as recited in claim 10, wherein table-reshaping transformations comprise one or more of an unpivot transformation, a pivot transformation, or a transpose transformation.

12. The system as recited in claim 10, wherein string-transformations comprise one or more of a split string-transformation, a concatenate string-transformation, or a substring string-transformation.

13. The system as recited in claim 9, wherein the set of transformations of the original table further comprises a no-op transformation.

14. The system as recited in claim 9, wherein the first weights are represented by vertices connected to the corresponding first edges.

15. The system as recited in claim 14, wherein the instructions stored in memory are further executable by the at least one processor to add second weights to the second set of edges, wherein the second weights represent join probabilities that the transformations represented by the vertices connected by the corresponding second edges will be joined.

16. The system as recited in claim 15, wherein determining the path through the global search tree includes jointly maximizing both the transformation probabilities of the original tables in the set of tables and join probabilities between the transformations of the original tables.

17. A non-transitory computer-readable medium comprising instructions that when executed by one or more processors cause one or more computing devices to:

determine, for each original table in a set of original tables, a set of transformations of the original table;

generate a global search tree including vertices representing, for each original table in the set of original tables, the original table and a corresponding set of transformations of the original table, and a first set of edges connecting the vertices for original tables to corresponding vertices for the sets of transformations for the original tables, the first set of edges having associated transformation weights associated with probabilities of the transformations from the original tables;

add, to the generated global search tree, a second set of edges representing possible joins between a transformation of each original table and at least one transformation of every other original table in the set of tables;

determine a graph solution that optimizes a path through the global search tree by traversing the first set of edges to at most one vertex representing a transformation of each original table and the second set of edges while touching at most one vertex representing a transformation of each original table in the set of tables, wherein determining the graph solution includes, for each original table from the set of original tables:

identifying a first edge from the first set of edges associated with a transformation having an associated transformation weight;

identifying a second edge from the second set of edges associated with a join operation having an associated join probability; and determining a path through the global search tree including the first edge and the second edge based on a combination of the associated transformation weight and the associated join probability; and for each original table from the set of original tables, execute the transformation associated with the first edge and the join operation associated with the second edge based on the determined path through the global search tree.

18. The non-transitory computer-readable medium as recited in claim 17, wherein the first weights are represented by vertices connected to the corresponding first edges.

19. The non-transitory computer-readable medium as recited in claim 18, further comprising instructions that when executed by the one or more processors cause one or more computing devices to add second weights to the second set of edges, wherein the second weights represent join probabilities that the transformations represented by the vertices connected by the corresponding second edges will be joined.

20. The non-transitory computer-readable medium as recited in claim 19, wherein determining the path through the global search tree includes jointly maximizing both the transformation probabilities of the original tables in the set of tables and join probabilities between the transformations of the original tables.

* * * * *